United States Patent
Raileanu et al.

(10) Patent No.: US 10,785,156 B2
(45) Date of Patent: Sep. 22, 2020

(54) SYSTEM AND METHOD FOR MANAGING BANDWIDTH USAGE RATES IN A PACKET-SWITCHED NETWORK

(71) Applicants: Grigore Raileanu, Chisinau (MD);
Maxim Basunov, Tiraspol (MD);
Victor Diaconu, Costesti (MD)

(72) Inventors: Grigore Raileanu, Chisinau (MD);
Maxim Basunov, Tiraspol (MD);
Victor Diaconu, Costesti (MD)

(73) Assignee: Noction, Inc., Oakland, CA (US)

( * ) Notice: Subject to any disclaimer, the term of this patent is extended or adjusted under 35 U.S.C. 154(b) by 198 days.

(21) Appl. No.: 15/973,890

(22) Filed: May 8, 2018

(65) Prior Publication Data
US 2018/0262429 A1    Sep. 13, 2018

Related U.S. Application Data

(62) Division of application No. 14/335,234, filed on Jul. 18, 2014, now Pat. No. 10,003,536.

(60) Provisional application No. 61/858,160, filed on Jul. 25, 2013.

(51) Int. Cl.
| H04L 12/26 | (2006.01) |
| H04L 12/24 | (2006.01) |
| H04L 12/803 | (2013.01) |
| H04L 12/707 | (2013.01) |
| H04L 12/721 | (2013.01) |

(52) U.S. Cl.
CPC ........ *H04L 47/122* (2013.01); *H04L 41/0896* (2013.01); *H04L 43/0888* (2013.01); *H04L 43/16* (2013.01); *H04L 45/22* (2013.01); *H04L 45/70* (2013.01)

(58) Field of Classification Search
CPC .. H04L 43/0888; H04L 43/16; H04L 41/0896
See application file for complete search history.

(56) References Cited

U.S. PATENT DOCUMENTS

| 2,421,919 A | 6/1947 | Avery |
| 3,155,775 A | 11/1964 | Zarouni |
| 3,231,676 A | 12/1966 | Carlstrom et al. |
| 3,342,945 A | 9/1967 | Hopper et al. |
| 3,525,814 A | 8/1970 | Cox |
| 3,591,724 A | 7/1971 | Yaku et al. |
| 4,475,192 A | 10/1984 | Fernow et al. |

(Continued)

OTHER PUBLICATIONS

"Carbon Copy Release 3.0" and "Multi-Log X.25." p. 26, Network World. Sep. 8, 1986.

(Continued)

*Primary Examiner* — Hoon J Chung
(74) *Attorney, Agent, or Firm* — Neal Marcus

(57) ABSTRACT

A computer-implemented system is disclosed for managing bandwidth usage rates in a packet switched network. The system includes one or more servers configured to execute computer program steps. The computer program steps comprises monitoring bandwidth usage rate at a first provider interface, determining if bandwidth usage rate at the provider interface exceeds a bandwidth usage rate limit; and rerouting Internet traffic from the provider interface having bandwidth that exceeds the bandwidth usage rate limit to a second provider interface having available bandwidth capacity.

3 Claims, 15 Drawing Sheets

(56) References Cited

U.S. PATENT DOCUMENTS

| | | |
|---|---|---|
| 4,484,326 A | 11/1984 | Turner |
| 4,556,972 A | 12/1985 | Chan et al. |
| 4,669,113 A | 5/1987 | Ash et al. |
| 4,704,724 A | 11/1987 | Krishnan et al. |
| 4,825,206 A | 4/1989 | Brice, Jr. et al. |
| 4,862,496 A | 8/1989 | Kelly et al. |
| 4,905,233 A | 2/1990 | Cain et al. |
| 4,979,118 A | 12/1990 | Kheradpir |
| 4,991,204 A | 2/1991 | Yamamoto et al. |
| 5,042,027 A | 8/1991 | Takase et al. |
| 5,063,523 A | 11/1991 | Vrenjak |
| 5,088,032 A | 2/1992 | Bosack |
| 5,117,422 A | 5/1992 | Hauptschein et al. |
| 5,142,570 A | 8/1992 | Chaudhary et al. |
| 5,150,360 A | 9/1992 | Perlman |
| 5,179,027 A | 1/1993 | Fisher |
| 5,203,012 A | 4/1993 | Patsiokas et al. |
| 5,233,604 A | 8/1993 | Ahmadi et al. |
| 5,239,653 A | 8/1993 | Cubero-Castan et al. |
| 5,253,248 A | 10/1993 | Dravida et al. |
| 5,317,562 A | 5/1994 | Nardin et al. |
| 5,377,327 A | 12/1994 | Jain et al. |
| 5,467,345 A | 11/1995 | Cutler, Jr. et al. |
| 5,495,426 A | 2/1996 | Waclawsky et al. |
| 5,517,620 A | 5/1996 | Hasimoto et al. |
| 5,521,910 A | 5/1996 | Matthews |
| 5,557,747 A | 9/1996 | Rogers et al. |
| 5,615,254 A | 3/1997 | Qiu et al. |
| 5,668,951 A | 9/1997 | Jain et al. |
| 5,724,513 A | 3/1998 | Ben-Nun et al. |
| 5,742,587 A | 4/1998 | Zornig et al. |
| 5,781,534 A | 7/1998 | Perlman et al. |
| 5,781,634 A | 7/1998 | Cordery et al. |
| 5,838,663 A | 11/1998 | Elwalid et al. |
| 5,870,561 A | 2/1999 | Jarvis et al. |
| 5,870,581 A | 2/1999 | Redford |
| 5,881,051 A | 3/1999 | Arrowood et al. |
| 5,884,047 A | 3/1999 | Aikawa et al. |
| 5,898,668 A | 4/1999 | Shaffer |
| 5,933,425 A | 8/1999 | Iwata |
| 5,953,312 A | 9/1999 | Crawley et al. |
| 5,995,503 A | 11/1999 | Crawley et al. |
| 6,016,307 A | 1/2000 | Kaplan et al. |
| 6,044,075 A | 3/2000 | Le Boudec et al. |
| 6,047,326 A | 4/2000 | Kilkki |
| 6,047,331 A | 4/2000 | Medard et al. |
| 6,055,571 A | 4/2000 | Fulp et al. |
| 6,047,677 A | 5/2000 | Kappler et al. |
| 6,061,723 A | 5/2000 | Walker et al. |
| 6,084,858 A | 7/2000 | Matthews et al. |
| 6,097,699 A | 8/2000 | Chen et al. |
| 6,104,700 A | 8/2000 | Haddock et al. |
| 6,130,890 A | 10/2000 | Leinwand et al. |
| 6,154,778 A | 11/2000 | Koistinen et al. |
| 6,181,679 B1 | 1/2001 | Ashton et al. |
| 6,185,635 B1 | 2/2001 | O'Loughlin et al. |
| 6,226,751 B1 | 5/2001 | Arrow et al. |
| 6,236,642 B1 | 5/2001 | Shaffer et al. |
| 6,249,801 B1 | 6/2001 | Zisapel et al. |
| 6,252,848 B1 | 6/2001 | Skirmont |
| 6,256,314 B1 | 7/2001 | Rodrig et al. |
| 6,260,072 B1 | 7/2001 | Rodriguez-Moral |
| 6,262,976 B1 | 7/2001 | McNamara |
| 6,275,470 B1 | 8/2001 | Ricciulli |
| 6,292,464 B1 | 9/2001 | Elahmadi et al. |
| 6,292,834 B1 * | 9/2001 | Ravi .......... H04L 29/06027 375/E7.004 |
| 6,301,244 B1 | 10/2001 | Huang et al. |
| 6,363,053 B1 | 3/2002 | Schuster et al. |
| 6,370,584 B1 | 4/2002 | Bestavros et al. |
| 6,374,300 B2 | 4/2002 | Masters |
| 6,393,486 B1 | 5/2002 | Pelavin et al. |
| 6,400,681 B1 | 6/2002 | Bertin et al. |
| 6,404,769 B1 | 6/2002 | Kapoor |
| 6,405,219 B2 | 6/2002 | Saether et al. |
| 6,456,594 B1 | 9/2002 | Kaplan et al. |
| 6,463,470 B1 | 10/2002 | Mohaban et al. |
| 6,466,984 B1 | 10/2002 | Naveh et al. |
| 6,473,802 B2 | 10/2002 | Masters |
| 6,493,317 B1 | 12/2002 | Ma |
| 6,516,192 B1 | 2/2003 | Spaur et al. |
| 6,522,881 B1 | 2/2003 | Feder et al. |
| 6,570,867 B1 | 5/2003 | Robinson et al. |
| 6,574,495 B1 | 6/2003 | Golman et al. |
| 6,578,076 B1 | 6/2003 | Putzolu |
| 6,594,268 B1 | 7/2003 | Aukia et al. |
| 6,606,303 B1 | 8/2003 | Hassel et al. |
| 6,658,457 B2 | 12/2003 | Nishikawa et al. |
| 6,665,702 B1 | 12/2003 | Zisapel et al. |
| 6,678,248 B1 | 1/2004 | Haddock et al. |
| 6,690,649 B1 | 2/2004 | Shimada |
| 6,697,333 B1 | 2/2004 | Bawa et al. |
| 6,718,359 B2 | 4/2004 | Zisapel et al. |
| 6,724,722 B1 | 4/2004 | Wang et al. |
| 6,728,265 B1 | 4/2004 | Yavatkar et al. |
| 6,745,243 B2 | 6/2004 | Squire et al. |
| 6,775,280 B1 | 8/2004 | Ma et al. |
| 6,785,237 B1 | 8/2004 | Sufleta |
| 6,801,502 B1 | 10/2004 | Rexford et al. |
| 6,816,464 B1 | 11/2004 | Scott et al. |
| 6,842,783 B1 | 1/2005 | Boivie et al. |
| 6,847,613 B2 | 1/2005 | Mimura et al. |
| 6,857,025 B1 | 2/2005 | Maruyama et al. |
| 6,914,886 B2 | 7/2005 | Peles et al. |
| 6,928,051 B2 | 8/2005 | Butt et al. |
| 6,947,379 B1 | 9/2005 | Gleichauf et al. |
| 6,954,431 B2 | 10/2005 | Roberts |
| 6,965,948 B1 | 11/2005 | Eneborg et al. |
| 6,981,055 B1 | 12/2005 | Ahuja et al. |
| 6,993,584 B2 | 1/2006 | Border et al. |
| 7,035,938 B2 | 4/2006 | Lau |
| 7,042,848 B2 | 5/2006 | Santiago et al. |
| 7,046,636 B1 | 5/2006 | Shaffer et al. |
| 7,051,367 B1 | 5/2006 | Krishnaswamy et al. |
| 7,065,044 B2 | 6/2006 | Wang et al. |
| 7,080,161 B2 | 7/2006 | Leddy et al. |
| 7,120,114 B1 | 10/2006 | Miyamoto |
| 7,133,365 B2 | 11/2006 | Klinker et al. |
| 7,139,242 B2 | 11/2006 | Bays |
| 7,222,190 B2 | 5/2007 | Klinker et al. |
| 7,230,919 B2 | 6/2007 | Flanagan et al. |
| 7,240,124 B2 | 7/2007 | Schwartz et al. |
| 7,260,645 B2 | 8/2007 | Bays |
| 7,269,157 B2 | 9/2007 | Klinker et al. |
| 7,272,115 B2 | 9/2007 | Maher, III et al. |
| 7,286,479 B2 | 10/2007 | Bragg |
| 7,336,613 B2 | 2/2008 | Lloyd et al. |
| 7,343,413 B2 | 3/2008 | Gilde et al. |
| 7,349,994 B2 | 3/2008 | Balonado et al. |
| 7,362,707 B2 | 4/2008 | McLampy et al. |
| 7,363,367 B2 | 4/2008 | Lloyd et al. |
| 7,363,371 B2 | 4/2008 | Kirkby et al. |
| 7,406,539 B2 | 7/2008 | Baldonado et al. |
| 7,457,233 B1 | 11/2008 | Gan et al. |
| 7,492,720 B2 | 2/2009 | Pruthi et al. |
| 7,561,517 B2 | 7/2009 | Klinker et al. |
| 7,606,160 B2 | 10/2009 | Klinker et al. |
| 7,668,966 B2 | 2/2010 | Klinker et al. |
| 8,203,954 B1 | 6/2012 | Patel et al. |
| 9,769,070 B2 | 9/2017 | Basunov |
| 10,003,536 B2 | 6/2018 | Raileanu et al. |
| 2001/0021176 A1 | 9/2001 | Mimura et al. |
| 2001/0023442 A1 | 9/2001 | Masters |
| 2001/0037387 A1 | 11/2001 | Gilde et al. |
| 2001/0042073 A1 | 11/2001 | Saether et al. |
| 2002/0010765 A1 | 1/2002 | Border |
| 2002/0010792 A1 | 1/2002 | Border et al. |
| 2002/0039352 A1 | 4/2002 | El-Fekih et al. |
| 2002/0057651 A1 | 5/2002 | Roberts |
| 2002/0057699 A1 | 5/2002 | Roberts |
| 2002/0075813 A1 | 6/2002 | Baldonado et al. |
| 2002/0078223 A1 | 6/2002 | Baldonado et al. |
| 2002/0040400 A1 | 8/2002 | Masters |
| 2002/0103846 A1 | 8/2002 | Zisapel et al. |

(56) References Cited

U.S. PATENT DOCUMENTS

| | | |
|---|---|---|
| 2002/0105909 A1 | 8/2002 | Flanagan et al. |
| 2002/0105911 A1 | 8/2002 | Pruthi et al. |
| 2002/0110084 A1 | 8/2002 | Butt et al. |
| 2002/0129161 A1 | 9/2002 | Lloyd et al. |
| 2002/0141378 A1 | 10/2002 | Bays et al. |
| 2002/0145981 A1 | 10/2002 | Klinker et al. |
| 2002/0163884 A1 | 11/2002 | Peles et al. |
| 2002/0176427 A1 | 11/2002 | Noda et al. |
| 2002/0184393 A1 | 12/2002 | Leddy et al. |
| 2002/0186661 A1 | 12/2002 | Santiago et al. |
| 2002/0199016 A1 | 12/2002 | Freedman |
| 2003/0002443 A1 | 1/2003 | Basso et al. |
| 2003/0012145 A1 | 1/2003 | Bragg |
| 2003/0016627 A1 | 1/2003 | McLampy et al. |
| 2003/0039212 A1 | 2/2003 | Lloyd et al. |
| 2003/0076840 A1 | 4/2003 | Rajagopal et al. |
| 2003/0086422 A1 | 5/2003 | Klinker et al. |
| 2003/0088529 A1 | 5/2003 | Klinker et al. |
| 2003/0088671 A1 | 5/2003 | Klinker et al. |
| 2003/0118029 A1 | 6/2003 | Maher, III et al. |
| 2003/0074449 A1 | 8/2003 | Smith et al. |
| 2003/0079005 A1 | 8/2003 | Myers et al. |
| 2003/0187934 A1 | 10/2003 | Nishikawa et al. |
| 2004/0196787 A1 | 10/2004 | Wang et al. |
| 2005/0152375 A1* | 7/2005 | An .................. H04L 47/11 370/395.41 |
| 2007/0041326 A1 | 2/2007 | Babiarz et al. |
| 2010/0075704 A1* | 3/2010 | McHenry .......... H04B 7/022 455/509 |
| 2014/0149350 A1* | 5/2014 | Chen .............. H04L 67/1095 707/634 |
| 2014/0179235 A1* | 6/2014 | Huang ............. H04B 7/0874 455/63.4 |
| 2014/0269324 A1 | 9/2014 | Tietz et al. |
| 2017/0041233 A1 | 2/2017 | Yurchenko et al. |

OTHER PUBLICATIONS

Leinwand, Allan. "Network Policy Engine NPE1010A Appliance". Network World, The Signature Series, Apr. 29, 2002.

Non-Final Office Action dated Apr. 22, 2016 for U.S. Appl. No. 14/335,234, filed Jul. 18, 2014 (Raileanu et al.).

Non-Final Office Action dated Sep. 8, 2016 for U.S. Appl. No. 14/335,234, filed Jul. 18, 2014 (Raileanu et al.).

Final Office Action dated Apr. 18, 2017 for U.S. Appl. No. 14/335,234, filed Jul. 18, 2014. (Raileanu et al.).

Non-Final Office Action dated Mar. 4, 2020 for U.S. Appl. No. 15/995,053, filed May 31, 2018 (Raileanu et al.).

Final Office Action dated Oct. 19, 2017 for U.S. Appl. No. 14/535,615, filed Nov. 7, 2014 (Raileanu et al.).

Non-Final Office Action dated Mar. 1, 2019 for U.S. Appl. No. 14/535,615, filed Nov. 7, 2014 (Raileanu et al.).

Non-Final Office Action dated Jul. 19, 2016 for U.S. Appl. No. 14/535,615, filed Nov. 7, 2014 (Raileanu et al.).

Final Office Action dated Dec. 12, 2019 for U.S. Appl. No. 14/535,615, filed Nov. 7, 2014 (Raileanu at al.).

Y. Rekhter, T. Li, S. Hares, "A Border Gateway Protocol 4 (BGP-4)", The Internet Engineering Task Force (IETF), RFC 4271, Jan. 2006. (http://www.ietf.org/rfc/rfc4271.txt).

B. Claise, Ed., "Specification of the IP Flow Information Export (IPFIX) Protocol for the Exchange of IP Traffic Flow Information," The Internet Engineering Task Force (IETF), RFC 5101, Jan. 2008. (http://www.ietf.org/rfc/rfc5101.txt).

B. Claise, Ed., "Cisco Systems NetFlow Services Export Version 9", The Internet Engineering Task Force (IETF), RFC 3954, Oct. 2004. (http://www.ietf.org/rfc/rfc3954.txt).

V. Fuller, T. Li, "Classless Inter-domain Routing (CIDR): The Internet Address Assignment and Aggregation Plan", The Internet Engineering Task Force (IETF), RFC 4632, Aug. 2006. (http://www.ietf.org/rfc/rfc4632.txt).

J. Moy, "OSPF Version 2", The Internet Engineering Task Force (IETF), RFC 2328, Apr. 1998. (http://www.ietf.org/rfc/rfc2328.txt).

D. Savage, D. Slice, J. Ng, S. Moore, R. White, "Enhanced Interior Gateway Routing Protocol, draft-savage-eigrp-00.txt", The Internet Engineering Task Force (IETF), Feb. 18, 2013. (https://tools.ietf.org/html/draft-savage-eigrp-00).

P. Phaal, S. Panchen, N. McKee, "InMon Corporation's sFlow: A Method for Monitoring Traffic in Switched and Routed Networks", The Internet Engineering Task Force (IETF), RFC 3176, Sep. 2001. (https://www.ietf.org/rfc/rfc3176.txt).

P. Phaal, "sFlow Version 5", Jul. 2004. (http://www.sflow.org/sflow_version_5.txt).

Savage, Stefan et al. "End-to-End Effects of Internet Path Selection." Department of Compute Science and Engineering, University of Washington, 1990.

"What is Best Path Global Transit." Opnix. Copyright 2000.

"Routing Intelligence System, Taming Internet Performance." Orbit 1000 routing intelligence system, Opnix, Inc. Copyright 2001.

John J. Hunter. "Topological optimization, Two new software tools help network planners optimize designs." p. 47, Network World. Sep. 14, 1987.

"Network Monitoring Using Cisco Service Assurance Agent." Feb. 24, 2014. (Archive.org—http://www.cisco.com/c/en/us/td/docs/ios/12_2/configfu/index.html).

G. Apostolopoulos, R. Gu'erin, S. Kamat, and S. Tripathi. "Improving QoS routing performance under inaccurate link state information," in Proceedings of ITC'16, Jun. 1999.

Jim Duffy. "HP fortifies management tools." p. 17, Network World. Dec. 2, 1996.

Ranjana Sharma. "Telemanagement packages centralize net control." p. 73, Network World. May 16, 1988.

"Network Performance Monitor Version 2 Release 1." IBM. Oct. 28, 1993.

Bob Wallace. "Cisco and Concord promise carrier info." Computerworld. Dec. 1, 1998.

Opnix. Jan. 24, 2001. (Archive.org).

"Introducing Routescience Pathcontrol." RouteScience Technologies, Inc. Copyright 2001.

Skip Macaskill. Chipcom casts its dice in switch mgmt. game. Network World. Jun. 15, 1994.

Patrick Dryden. "The LAN, WAN monitoring frontier." p. 63, Computerworld. Jul. 15, 1996.

"Load Balancing with CEF." Cisco Systems. Dec. 14, 2002. (http://www.cisco.com/en/US/products/hw/modules/ps2033/prod_technical_reference09186a00800afeb7.html).

Leonard Kleinrock, "Message Delay in Communication Nets with Storage". Massachusetts Institute of Technology, Dec. 1962.

John M. McQuillan, Ira Richer, Eric C. Rosen. "The New Routing Algorithm for the ARPANET". IEEE Transactions on Communications, May 1980. p. 711-19.

D.L. Mills. "Request for Comments 904; Exterior Gateway Protocol Formal Specification". Network Working Group, Apr. 1984.

"Products and Services". Network World, Sep. 8, 1986, p. 26-27.

Paul Korzeniowski. "Early users give thumbs up to Peregrine system". Network World, Sep. 28, 1987. p. 23-25.

Ranjana Sharma. "Telemanagement packages centralize net control". Network World, May 16, 1988. P. 73.

J. Case, M. Fedor, M. Schoffstall, J. Davin. "Requests for Comments 1067; A Simple Network Management Protocol". Network Working Group, Aug. 1988.

"Principles for a Telecommunications Management Network" International Telecommunication Union, Nov. 1988.

J. Rekhter. "Request for Comments 1092; EGP and Policy Based Routing in the New NSFNET Backbone", Feb. 1989.

K. Lougheed, Y. Rekhter. "A Border Gateway Protocol". Request for Comments 1105, Network Working Group, Jun. 1989.

M. Little. "Goals and Functional Requirements for Inter-Autonomous System Routing". Request for Comments 1126, Network Working Group. Oct. 1989.

J. Moy. "The OSPF Specification". Request for Comments 1131, Network Working Group, Oct. 1989.

Dr. Jason Liu. "Advanced Facilities to Expedite Design and Evaluation of Communications Systems". SBIRSource, Dec. 31, 1989.

(56) References Cited

OTHER PUBLICATIONS

David Oran. "OSI IS-IS Intra-domain Routing Protocol". Request for Comments 1142, Network Working Group, Feb. 1990.
Paul Li. "Who's accepting deposits in the repository?" Network World, Apr. 16, 1990. p. 37.
K. McCloghrie, M. Rose. "Request for Comments 1213; Management Information Base for Network Management of TCP/IP-Based Internets: MIB-II". Network Working Group, Mar. 1990.
Charles L. Hedrick Rutgers. "An Introduction to IGRP". Cisco, Aug. 22, 1991.
Roch A. Guerin, Hamid Ahmadi, Mahmoud Naghsineh. "Equivalent Capacity and Its Application to Bandwidth Allocation in High-Speed Networks". University of Pennsylvania Scholarly Commons, Sep. 1, 1991. p. 968-81.
K. Lougheed, Y. Rekhter. "A Border Gateway Protocol 3 (BGP-3)", Request for Comments 1267, Network Working Group. Oct. 1991.
Y. Rekhter, P. Gross. "Application of the Border Gateway Protocol in the Internet", Request for Comments 1268, Network Working Group, Oct. 1991.
P. Almquist. "Type of Service in the Internet Protocol Suite". Request for Comments 1349, Network Working Group, Jul. 1992.
Karyl Scott. "NetWare Multiprotocol Router-Basic". InfoWorld, Jul. 13, 1992. p. 47.
Cengiz Alaettinoglu, A. Udaya Shankar, Klaudia Dussa-Zieger, Ibrahim Matta. "Design and Implementation of MaRS: A Routing Testbed". University of Maryland, Sep. 1992.
Jim Duffy. "Frontier Software Pioneers RMON for the WAN with NETscout Analyzer". Network World, Aug. 16, 1993. p. 17.
"Announcement Letter No. 293-625". IBM, Oct. 28, 1993. p. 1-12.
R. Fabregat-Gasa, J.L. Marzo-Lazaro, J. Sole-Pareta, J. Domino-Pascual. "Adaptive Routing Based on Real-Time Calculations Using the Convolution Approach". EFOC & N, 1994.
Frisch et al., Network Management and Control, vol. 2, Plenum Press, 1994. p. 471.
J. Moy. "OSPF Version 2". Request for Comments 1583, Network Working Group, Mar. 1994.
Abhay K. Parekh, Robert G. Gallagher. "A Generalized Processor Sharing Approach to Flow Control in Integrated Services Networks: The Multiple Node Case". IEEE/ACM Transactions on Networking, Apr. 1994.
Skip MacAskill. "Chipcom casts its dice in switch mgmt. game". Network World, Jun. 15, 1994. p. 87.
Y. Rekhter. "A Border Gateway Protocol 4 (BGP-4)". Request for Comments 1654, Network Working Group, Jul. 1994.
S. Waldbusser. "Remote Network Monitoring Management Information Base". Request for Comments 1757, Network Working Group, Feb. 1995.
Y. Rekhter, P. Gross. "Application of the Border Gateway Protocol in the Internet". Request for Comments 1772, Network Working Group, Mar. 1995.
"BISDN Inter Carrier Interface (B-ICI) Specification Version 2.0 (Integrated)". The ATM Forum Technical Committee, Dec. 1995.
"Private Network-Network Interface Specification Version 1.0 (PNNI 1.0)". The ATM Forum Technical Committee, Mar. 1996.
J. Hawkinson, T. Bates. "Guidelines for Creation, Selection and Registration of an Autonomous System (AS)". Request for Comments 1930, Network Working Group, Mar. 1996.
Patrick Dryden. "The LAN, WAN Monitoring Frontier". Computerworld, Jul. 15, 1996.
John McConnell. "Behavior mgmt tames client/server environments". Network World, Apr. 22, 1996. p. 44.
E. Chen, T. Bates. "An Application of the BGP Community Attribute in Multi-Home Routing". Request for Comments 1998, Network Working Group, Aug. 1996.
Zheng Wang, Jon Crowcroft. "Quality-of-Service Routing for Supporting Multimedia Applications". IEEE Journal on Selected Areas in Communications, Sep. 1996. p. 1228-34.
R. Minnear, R. Hinden. "IGRPng for IPv6", Internet Draft, IGRPng, Nov. 1996.

"Frontier Software Development Becomes NetScout Systems, taking on name of leading product family". Business Wire, Mar. 31, 1997.
S. Shenker, J. Wroclawski. "General Characterization Parameters for Integrated Service Network Elements". Request for Comments 2215, Network Working Group, Sep. 1997.
Emily Fitzloff. "Hp NetMetrix 5.0 gets improved RMON2 capabilities". p. 51, Infoworld, Sep. 2, 1997.
Kevin Thompson, Gregory J. Miller, Rick Wilder. "Wide-Area Traffic Patterns and Characteristics" (Extended Version). IEEE Network, Nov./Dec. 1997.
Jim Duffy. "HP Plans Big Event for Open View 6.0". p. 5. Network World, Dec. 15, 1997.
"Tivoli NetView Performance Monitor Expands Monitoring Support to TCP/IP". IBM, Jun. 23, 1998.
E. Crawley, R. Nair, B. Rajagoapala. "A Framework for QoS-Based Routing in the Internet". Request for Comments 2386, Network Working Group, Aug. 1998.
Andy Collins. "The Detour Framework for Packet Rerouting", University of Washington, Oct. 29, 1998.
Jeff Caruso. "Net Management Wises Up". Network World, Dec. 14, 1998. p. 8.
Bob Wallace. "Cisco and Concord Promise Carrier Info". Computerworld, Dec. 21, 1998. p. 16.
Steven Low. "Optimization Flow Control With On-Line Measurement or Multiple Paths". University of Melbourne, Feb. 25, 1999.
"HP OpenView NetMatrix/UX Distributed Network Analysis Version 6.02". DNA User's Guide, Jun. 1999.
"Cisco IOS 12.0 Quality of Service". "Policy-Based Routing". Cisco Press, Apr. 23, 1999. p. 6-7.
D. Awduche, J. Malcolm, J. Agogbua, M. O'Dell, J. McManus. "Requirements for Traffic Engineering Over MPLS". Request for Comments 2702, Network Working Group, Sep. 1999.
G. Apostolopoulos, D. Williams, S. Kamat, R. Guerin, A. Orda, T. Przygienda. "QoS Routing Mechanisms and OSPF Extensions". Request for Comments 2676, Network Working Group, Aug. 1999.
Wei Sun. "QoS/Policy/Constraint Based Routing". Ohio State University, Dec. 1, 1999.
"Transport Network Event Correlation". International Telecommnuication Union, Feb. 2000.
"Tivoli NetView Performance Monitor for TCP/IP Helps Optimize IP Network Performance". IBM, Sep. 5, 2000.
Peter Morrissey. "IP Routing Primer: Part Five". Network Computing, Dec. 4, 2000.
P. Phaal, S. Panchen, N. McKee. "Request for Comments 3176; InMon Corporation's sFlow: A Method for Monitoring Traffic in Switched and Routed Networks". Network Working Group, Sep. 2001.
David Anderson, Hari Balakrishnan, Frans Kaashoek, Robert Morris. "Resilient Overlay Networks". AC, Oct. 2001.
"Tivoli NetView 7.1 Offers Enhanced Network Management Capabilities at Lower Cost". IBM, Oct. 16, 2001.
"Capital Rut Has Little Weight for Internet Route Controllers". The Wall Street Journal (www.wsj.com/artciles/SB101097122166056660), Jan. 14, 2002.
Hedrick, Charles L. "An Introduction to IGRP". Document ID 26825, Rutgers University, The State University of New Jersey, Center for Computers and Information Services, Laboratory for Computer Science Research, Aug. 22, 1991.
Jacobson, Van, and Karels, Michael J. "Congestion Avoidance and Control." Nov. 1988.
"Proficient Networks NPE1010A Network Policy Engine". Proficient Networks, Inc. Copyright 2001.
Cisco. "Cisco-IGRP Metric". Cisco Systems, Inc., 1992-2002.
Aukia, Petri, and Oy, Nixu. "Quality of Service Based Routing". (http://web.archive.org/web/20051124171849/http://www.tml.tkk.fi/Opinnot/Tik-110.551/1996/qos_rout.html). Nov. 24, 2005.
Cisco. "BGP Link Bandwidth". pp. 1-16, Cisco Systems, Inc., Jan. 6, 2011.
Baumann, Rainer, Heimlicher, Simon, Strasser, Mario, and Weibel, Andreas. "A Survey on Routing Metrics". TIK Report 262, Computer Engineering and Networks Laboratory, ETH-Zentrum, Switzerland, Feb. 10, 2007.

(56) References Cited

OTHER PUBLICATIONS

Rekhter, Y., and Li, T. A Border Gateway Protocol 4 (BGP-4). Request for Comments: 1771, T.J. Watson Research Center, IBM Corp., Mar. 1995.
"HP fortifies management tools". WANs & Internetworking, Network World, Dec. 2, 1996, p. 17.
Seshan, Srinivasan, et al. "Handoffs in Cellular Wireless Networks: The Daedalus Implementation and Experience". Wireless Personal Communications, Jan. 1997.
"Route Control: Building Real Confidence in the Internet". TeleChoice, Feb. 28, 2002.
Fitzsimmons, Heather. "Proficient Networks Unveils Comprehensive Bandwidth Management Capabilities for the Enterprise Data Center." Business Wire, Jun. 23, 2003.
Cisco. "Response Time Reporter Enhancements". CISCO IOS Release 12.0(3)T. Mar. 18, 2006. (http://web.archive.org/web/*/http://www.optimumdata.com/shop/files/cisco/2600/2600_Response_Time_Reporter_Enhancements.pdf).
Gomez, Shaun. "CCIE Studies: Performance Routing PfR/OER". Technology Evangelist, Jul. 22, 2013.
Sharma, Ranjana. "Telemanagement Packages Centralize Net Control". Network World, May 16, 1988, p. 73.
Scott, Karyl. "NetWare Routing Router-Basic". Infoworld, Jul. 13, 1992, p. 47.
Duffy, Jim. "Frontier Software Pioneers RMON for the WAN with NETscout Analyzer". Network World, Aug. 16, 1993, p. 17.
"Netview Performance Monitor Version 2 Release 1". Announcement letter No. 293-625, IBM. dated Oct. 28, 1993.
Dryden, Patrick. "The LAN, WAN Monitoring Frontier". Computerworld, Jul. 15, 1996, p. 63.
Fitzloff, Emily. "HP NetMetrix 5.0 Gets Improved RMON2 Capabilities". Infoworld, Sep. 22, 1997, p. 51.
Duffy, Jim. "HP Plans Big Event for OpenView 6.0". Network World, Dec. 15, 1997, p. 5.
Wallace, Bob. "Cisco and Concord Promise Carrier Info". Computerworld, Dec. 21, 1998, p. 16.
Opnix. Copyright 2000. (www.opinix.com/whatwedo/whatwedo.shtml).
Howe, Peter J. "Sockeye Wins $28 Million in VC Funds for its Routing System Gets Data Past Net Traffic Jams". p. C3, Business Section, The Boston Globe, Jun. 25, 2001.
"Company Overview". Sockeye Networks. (http://web.archive.org/web/20010702084014/http://www.sockeye.com/pages/overview.htm), Jul. 2, 2001.
Fitzloff, Emily. "Seagate NerveCenter to Provide Mixed NT/Unix Event Correlation". Infoworld, Feb. 9, 1998, p. 45.
Duffy, Jim. "HP to Pop Two Products for Network Service Management". Network World, Jun. 1, 1998, p. 13.
Francis, Peter. "Re: Routescience?" North American Network Operators Group, Aug. 22, 2001.
Routescience. "Introducing Routescience Pathcontrol". RouteScience Technologies, Inc., Copyright 2001.
Non-Final Office Action dated Nov. 17, 2016 for U.S. Appl. No. 14/535,615, filed Nov. 7, 2014. (Raileanu et al.).
Non-Final Office Action dated Jan. 9, 2017 for U.S. Appl. No. 14/535,615, filed Nov. 7, 2014 (Raileanu et al.).
Non-Final Office Action dated Jul. 19, 2016 for U.S. Appl. No. 14/607,545, filed Jan. 28, 2015 (Basunov).
Zhang, Lixia. "VirtualClock: A New Traffic Control Algorithm for Packet Switching Networks." ACM 1990.
"What We Do—Simply High-Performance Bandwidth." Jan. 24, 2001. Opnix. (http://web.archive.org/web/20010124043200/http://www.opnix.com/whatwedo/performance.shtml).
Non-Final Office Action dated Jul. 23, 2020 for U.S. Appl. No. 15/995,053, filed May 31, 2018 (Raileanu et al.).

* cited by examiner

SYSTEM AND METHOD FOR MANAGING BANDWIDTH USAGE RATES IN A PACKET-SWITCHED NETWORK

CROSS-REFERENCE TO RELATED APPLICATIONS

This application is a divisional application of U.S. application Ser. No. 14/335,234, filed Jul. 18, 2014 which claims priority to U.S. Provisional Application No. 61/858,160, filed Jul. 25, 2013, which are all incorporated by reference herein.

FIELD OF THE INVENTION

The present invention relates to managing bandwidth usage rates, and more particularly to a system and method for managing bandwidth usage rates in a packet-switched network.

BACKGROUND OF THE INVENTION

Multi-homed networks are often connected to the Internet through several Internet Service Providers (ISPs). Multi-homed networks are advantageous if one of the connections to an ISP fails. Each ISP assigns an IP address (or range of them) to a company. As soon as a router assigned to connect to that ISP determines that the connection is lost, it will reroute all data through one of the other routers. In order to decrease operational costs and improve on network reliability and performance, however, multi-homed networks require bandwidth management and control. Bandwidth management and control typically involves managing bandwidth usage rates (also known as bandwidth rates) by considering bandwidth usage rate limitations (limits). These limitations include capacity limits, physical limits or contracted bandwidth limits (e.g., flat rate or 95th percentile).

In such multi-homed networks, bandwidth usage rates must be managed for each provider interface within a group of provider interfaces (two or more provider interfaces that form a group for bandwidth balancing). A provider interface is a hardware part of a router or network device designated for connection with an Internet Service Provider's router or other hardware as known to those skilled in the art. Bandwidth usage rates may require balancing across two or more provider interfaces within a provider interface group for improving network efficiency, reliability and costs. The typical answer or solution for managing bandwidth rates is to manually reroute some network prefixes carrying a specific amount of bandwidth to other provider interfaces. However, this task is too complex and time consuming when it must be performed on an ongoing or periodic basis.

It would thus be advantageous to provide a system and method that will overcome the problems described above.

SUMMARY OF THE INVENTION

A system and method is disclosed for managing bandwidth usage rates in a packet-switched network.

In accordance with an embodiment of the present disclosure, a computer-implemented system is disclosed for managing bandwidth usage rates in a network. The system includes one or more servers configured to execute computer program steps. The computer program steps comprise monitoring bandwidth usage rate at a first provider interface, determining if bandwidth usage rate at the provider interface exceeds a bandwidth usage rate limit, and rerouting Internet traffic from the provider interface having bandwidth that exceeds the bandwidth usage rate limit to a second provider interface having available bandwidth capacity.

In accordance with yet another embodiment of the present disclosure, a computer-implemented system is disclosed for managing bandwidth usage rates in a network. The system including one or more servers having memory, one or more processors and one or more computer program modules stored in the memory and configured to be executed by the one or more processors, the computer program modules comprising instructions for monitoring bandwidth usage rate at a provider interface, determining bandwidth overusages on the provider interface, whereby bandwidth overusage is determined when a bandwidth rate on the provider interface exceeds a bandwidth rate limit and a protection gap, determining a number of bandwidth overusages that exceed a number of allowable bandwidth overusages at the provider interface during an interval of time, and adjusting a protection gap for the provider interface based on the number of exceeding overusages to reduce the number of bandwidth overusages to a value less than the number of allowable bandwidth overusages.

In accordance with yet another embodiment of the present disclosure, a computer-implemented system is disclosed for managing bandwidth usage rates in a network. The system includes one or more servers configured to execute computer program steps. The computer program steps comprise collecting bandwidth usage data for a plurality of provider interfaces, retrieving bandwidth usage data from the network relating to the plurality of provider interfaces, requesting for probing network prefixes for the plurality of provider interfaces to determine network prefixes that can be rerouted, determining if bandwidth rate at the plurality of provider interfaces exceed bandwidth rate limits, retrieving network prefix evaluation results to determine network prefixes that can be rerouted, and applying new routes on network in accordance with network prefixes that can be rerouted.

In accordance with yet another embodiment of the present disclosure, a computer-implemented system is disclosed for managing bandwidth usage rates in a network. The system includes one or more servers configured to execute computer program steps. The computer program steps comprises forming a group of provider interfaces that may be controlled as an aggregated group of provider interfaces, calculating aggregated group total limit and aggregated group usage values, and determining if aggregated group usage values exceed group limits.

In accordance with another embodiment of the present disclosure, a computer-implemented method is disclosed for managing bandwidth rate in a packet switched network, wherein the method is implemented in one or more servers programmed to execute the method, the method comprising monitoring, by the one or more servers, bandwidth rate for a provider interface, comparing, by the one or more servers, the monitored bandwidth rate to a bandwidth rate limit, and determining if the bandwidth rate exceeds the bandwidth rate limit. In the embodiment, the method further comprises monitoring, by the one or more servers, an amount of data carried by a plurality of network prefixes, selecting, by the one or more servers, a plurality of network prefixes that carry an amount of bandwidth to be rerouted from a provider interface that exceeds the bandwidth rate limit, determining, by the one or more servers, a destination provider interface for rerouted bandwidth, and injecting, by the one or more servers, a network prefix into a router.

In accordance with yet another embodiment of the present disclosure, a system is disclosed for managing bandwidth usage rate for one or more provider interfaces in a network. The system includes one or more interconnected routers and one or more servers communicating with the one or more routers configured to execute one or more of the computer program modules stored in the one or more servers. The computer program modules comprise a first module (traffic collector) for analyzing network prefixes of a plurality of provider interfaces carrying an amount of bandwidth, a second module (network explorer) for determining network prefixes of the plurality of provider interfaces capable of receiving rerouted bandwidth, a third module (route injector) for communicating with the one or more routers for injecting routing changes based on the network prefixes capable of receiving rerouted bandwidth, a fourth module (stats collector) for periodic retrieval of the current provider interface bandwidth usage rates, and a fifth module (bandwidth controller) for determining if bandwidth usage rates exceed a bandwidth limit.

In yet another embodiment of the present disclosure, a method is disclosed for managing a controlled network including multiple connections to an Internet Service Provider or a plurality of Internet Service Providers. The method is implemented in one or more servers programmed to execute the method. The method comprises monitoring bandwidth usage rates at a plurality of provider interfaces, evaluating network prefixes carrying a specific amount of Internet traffic, comparing estimated bandwidth rate with the bandwidth rate limits specified in a central repository and dynamic bandwidth rate limits evaluated in order to reroute network prefixes carrying a specific amount of bandwidth to prevent violation of bandwidth rate limits and to prevent network performance degradation by the provider interface congestion.

In accordance with this embodiment of the disclosure, a method is disclosed for managing a controlled network, wherein the method is implemented in one or more servers programmed to execute the method. The method comprises detecting whether a provider interface exceeds a bandwidth rate limit, detecting network prefixes carrying a specific amount of bandwidth transmitted through the provider interface, selecting the statistics for each network prefix in the context of all providers interfaces, omitting provider interfaces with no statistics, omitting providers interfaces with worse performance metrics, omitting provider interfaces where current bandwidth usage rate exceeds the bandwidth rate limits, storing remaining provider interfaces in a sorted list, selecting the first provider interface from the sorted list, and storing the selection into the central repository.

DETAILED DESCRIPTION OF THE INVENTION

In the following detailed description, reference will be made to the accompanying drawing(s), in which identical functional elements are designated with numerals. The aforementioned accompanying drawings show by way of illustration and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. In addition, certain terms used herein are defined in this disclosure. Terms that are capitalized shall have the same meaning as those terms without capitalization (in this disclosure or the disclosure in the priority provisional application identified above).

Figure 1:
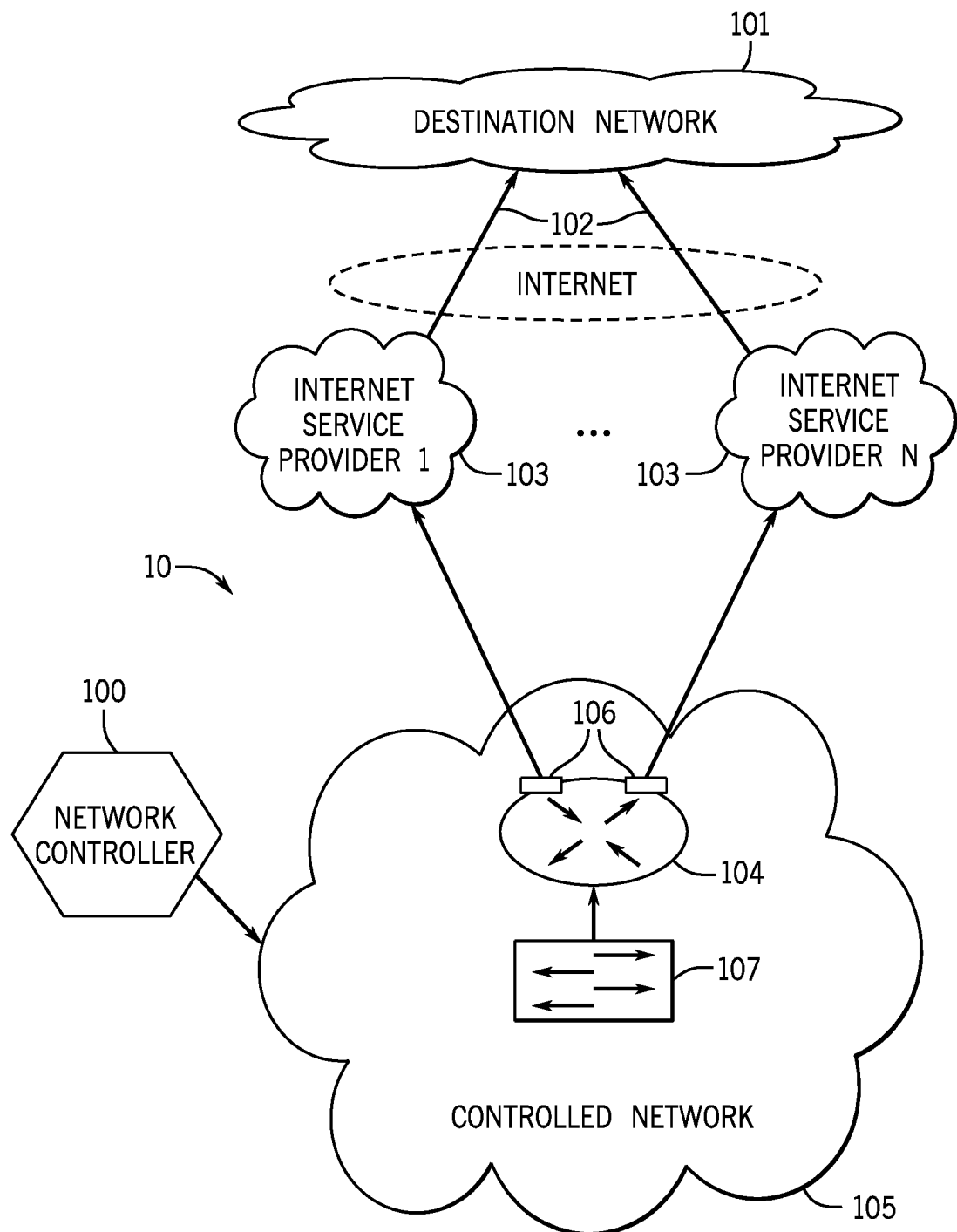
FIG. 1 illustrates a diagram of an example system for bandwidth rate management in packet-switched network.

FIG. 1 illustrates a diagram of an example system 10 for bandwidth rate management in a packet-switched network in accordance with an embodiment of this disclosure. In particular, system 10 includes network controller 100, two or more Internet Service Providers 103, one or more routers 104, provider interfaces 106, network device 107, controlled network 105 and destination network 101.

Controlled network 105 is connected to Internet Service Providers 103 via routers 104. Network controller 100 is connected to (communicates with) controlled network 105 and network device 107. Network device 107 is connected to routers 104. Routers 104 are also connected to Internet Service Providers 103 via provider interfaces 106. Internet Service Providers 103 are connected to (communicate with) destination network 101 via communication paths 102 (through the Internet).

Network controller 100 includes one or more servers or other computers that comprise a set of software modules for implementing system 10 in accordance with embodiments of this disclosure. Network controller 100 and these modules are discussed in more detail below.

Destination network 101 is the destination network in which Internet traffic is intended for delivery.

Internet Service Providers 103 are companies that offer Internet service (access) to its customers as known to those skilled in the art.

Routers 104 are components in the controlled network 105 that are used to route data through a network as known to those skilled in the art. Routers 104 provide dynamic routing protocol support and IP traffic statistics reporting (export). Cisco Systems, Inc., for example, manufactures and markets many routers that may be used.

Controlled network 105 comprises (1) the computer servers, routers and other components including routers 104 and network device 107 and (2) computer program modules and other software that make a network of a business or enterprise.

Provider interfaces 106 are a hardware part of routers 104 or alternatively network device 107. Provider interfaces 106 are used to provide connectivity to the routers and/or other hardware components of Internet Service Providers 103.

Network device 107 is a component within controlled network 105. Network device 107 includes one or more packet switches, routers or other network devices as known to those skilled in the art with the ability to duplicate traffic data. Network device 107 is used to copy all transit IP packets to traffic collector 108 as described below. (Routers 104 can function similarly to network device 107 and network device 107 can function similarly to routers 104).

Figure 2:
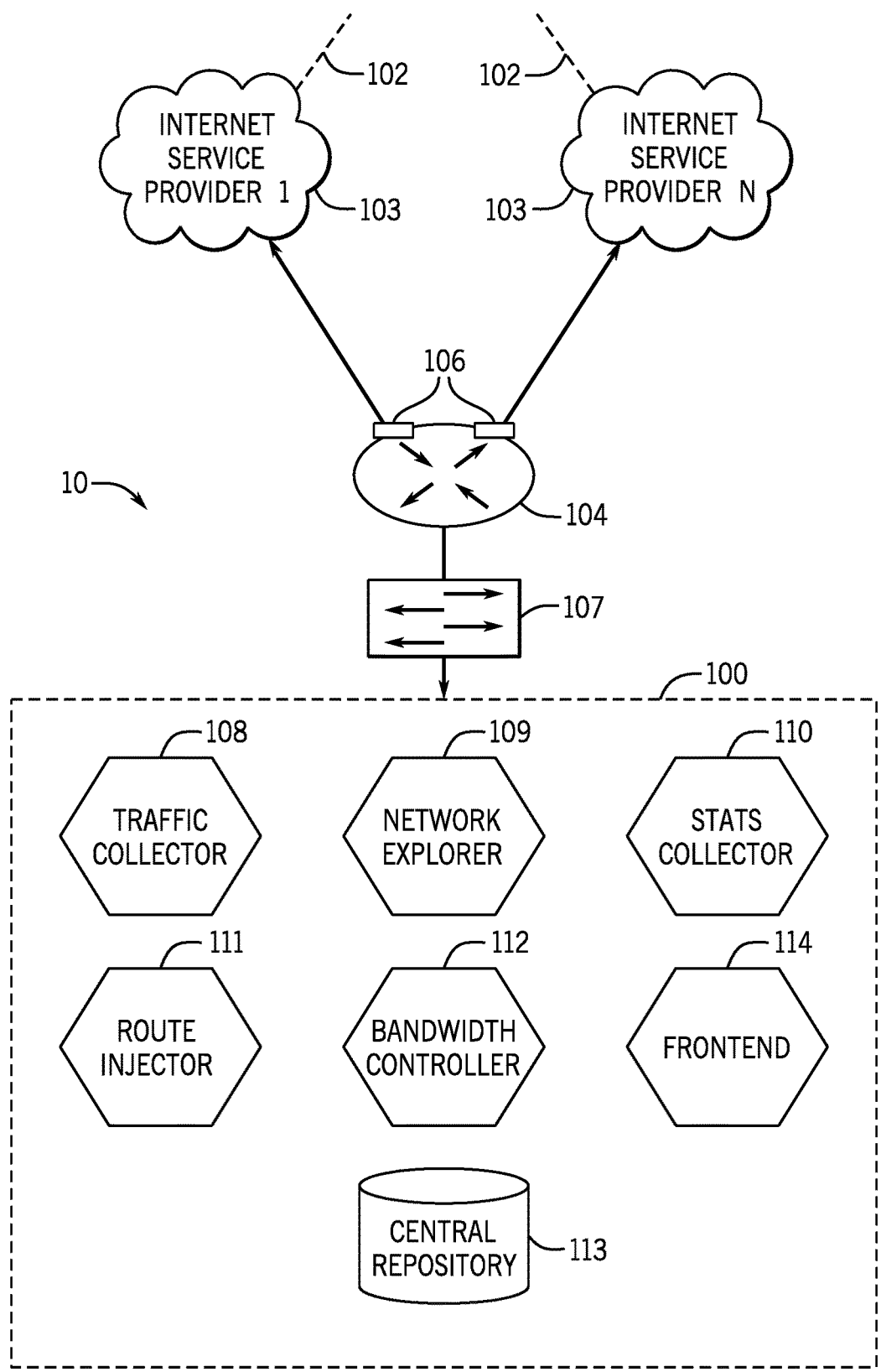
FIG. 2 illustrates the system shown in FIG. 1 wherein a network controller is shown in greater detail.

Reference is now made to FIG. 2. FIG. 2 illustrates system 10 shown in FIG. 1 wherein network controller 100 is shown in greater detail. As indicated above, there are two alternate transmission paths 102 connecting controlled network 105 to destination network 101 via Internet Service Providers 103. In order for system 10 to operate as disclosed herein, controlled network 105 must incorporate two or more alternative transmission paths 102 to the destination network 101 to enable the proper rerouting of Internet traffic (data). In accordance with an embodiment of the present disclosure, system 10 will not be activated until a current bandwidth usage rate (information volume/time, e.g., Megabits per second) of the Internet Service Providers 103 exceeds the bandwidth rate limits (e.g., bandwidth rate limit, 95th bandwidth rate limit, or limits inside a provider interfaces group) set by the operator. That is, once the bandwidth rate at provider interface 106 is exceeded, system 10 is triggered and data is rerouted in accordance with an embodiment of the present disclosure as described in more detail below.

Figure 16:
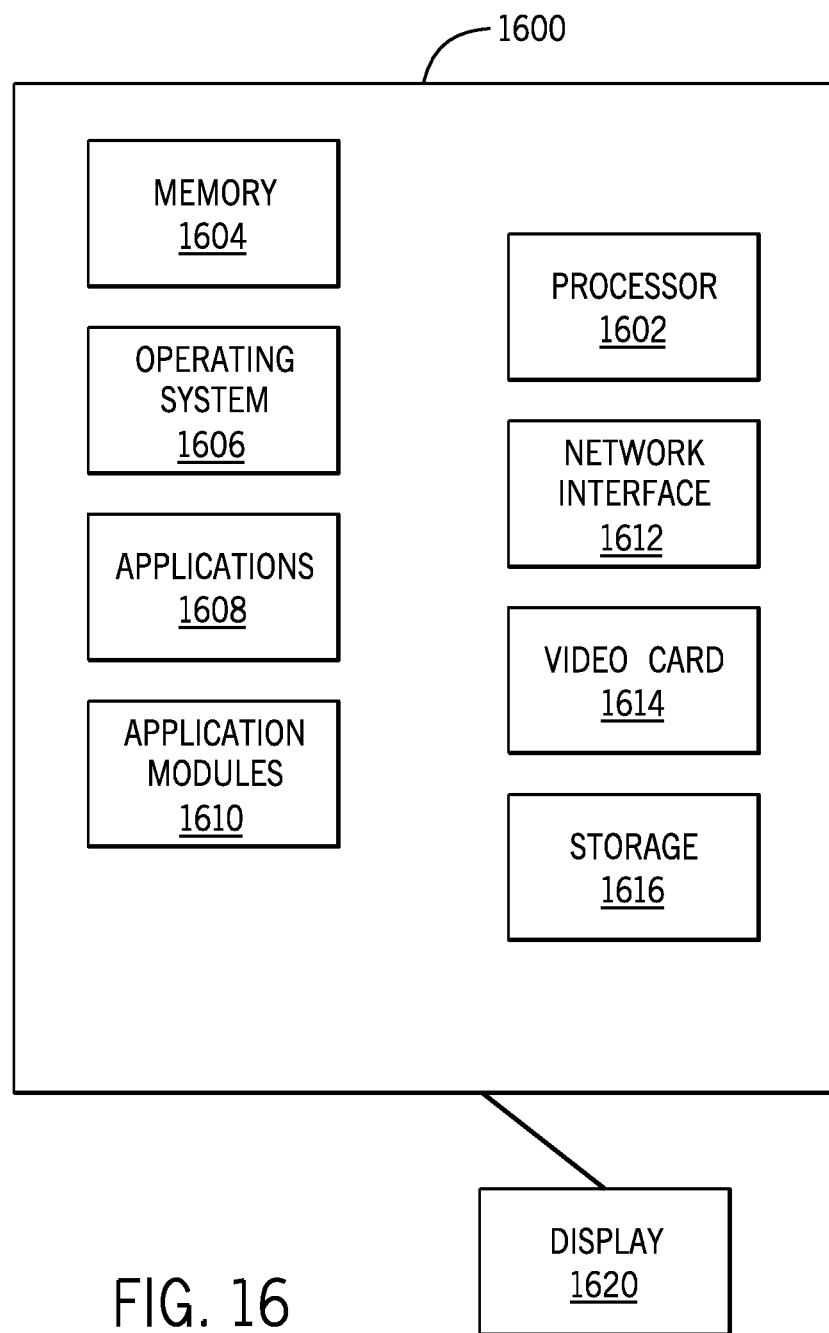
FIG. 16 illustrates a block diagram of a general purpose computer to support the embodiments of the systems and methods including the computer program modules disclosed in this application.

Reference is now made to network controller 100 in FIG. 2 in detail. As indicated above, network controller 100 is a system that includes one or more servers incorporating a plurality of computer program modules. These servers include, among other components, one or more processors for executing the plurality of computer program modules. An example of a server is shown in FIG. 16. These modules include traffic collector 108, network explorer 109, stats collector 110, route injector 111, bandwidth controller 112, frontend 114, central repository 113. The modules described above or portions thereof may be incorporated on servers and/or other components that are part of or entirely separate from controlled network 105 as known to those skilled in the art. Network controller 100 is connected to controlled network 105.

Traffic collector 108 is a module that analyzes network prefixes carrying a specific amount of bandwidth by using different network monitoring protocols for gathering IP traffic statistics.

Network explorer 109 is a module used for determining network prefix reachability and measuring and collecting each network prefix performance metrics such as packet loss, latency, jitter, and stores these metrics into the central repository 113. This is referred to as probing to distinguish from processes that determine reachability, measure and collect data for other purposes.

Stats collector 110 is a module used for monitoring and periodic retrieval of current Interface bandwidth usage rate of provider interfaces 106.

Route injector 111 is a module used for communicating with routers 104 for injecting routing changes using Border Gateway Protocol (BGP) or by other dynamic routing protocols as known to those skilled in the art.

Bandwidth controller 112 is a module used for performing analysis of data collected by traffic collector 108, network explorer 109 and stats collector 110 and making traffic routing decisions.

Frontend 114 is a module for interacting with operators to enable them to configure, monitor and report to an operator. That is, frontend 114 is a visual interaction interface between operator and network controller 100. Frontend 114 is described in more detail below. (The operator may be a person or automatic management, monitoring or reporting system as known to those skilled in the art.)

Central repository 113 is a module for storing module(s) configuration information and transferring or storing data exchanged between the modules. Central repository 113 may be a database or other storage medium.

As indicated above, controlled network 105 includes network device 107. Network device 107 includes one or more packet switches, routers or other network devices with the ability to duplicate traffic data. That is, network device 107 is used to copy all or some transit IP packets to traffic collector 108. As indicated above, system 10 further includes a plurality of Internet Service Providers 103 and corresponding provider interfaces 106 for connecting and communicating with Internet Service Providers 103. The duplicated traffic is generated by network device 107 and collected by the traffic collector 108 (port mirroring). The IP traffic statistics are generated by routers 104 and collected by the traffic collector 108. Traffic collector 108 arranges and aggregates received data, and stores it into central repository 113. Examples of IP traffic statistics appear at the rear of this description.

As indicated above, stats collector 110 periodically retrieves provider interfaces 106 bandwidth statistics from routers 104 and network device 107 and stores this data in central repository 113. The network explorer 109 measures each network prefix performance metrics, such as packet loss, latency, jitter, and stores these metrics into the central repository 113. Bandwidth controller 112 retrieves the list of provider interfaces 106 exceeding bandwidth rate limits from central repository 113, bandwidth controller 112 also retrieves the list of network prefixes from central repository 113 that can be rerouted from a provider interface 106 that exceeds bandwidth rate limits to a destination provider interface 106 that has been selected for data rerouting in accordance with the present an embodiment of the present disclosure. Route injector 111 applies the selection made by bandwidth controller 112 to a single or multiple routers 104 (for Internet traffic egress).

System 10 collects provider interface 106 bandwidth statistics and stores the collected information in the central repository 113. The bandwidth statistics include the amount of data sent and received via the provider interfaces over a specific period of time. The value of this period of time is preferably 60 seconds, but those skilled in the art know that various time periods may be used for this purpose. Examples of bandwidth statistics appear at the rear of this description.

Traffic collector 108 collects IP traffic statistics, based upon network monitoring protocols known to those skilled in the art. An example of such protocols is IP Flow Information Export (IPFIX). IPFIX is described in "Specification of the IP Flow Information Export (IPFIX) Protocol for the Exchange of IP Traffic Flow Information," B. Claise, IETF RFC 5101, January 2008. Another exemplary protocol is derived from sFlow in accordance with the protocol specifications promulgated by the sFlow.org consortium, netflow, or analyzing raw, duplicated traffic data. These standards/specifications and protocols may be found at the Internet Engineering Taskforce (IETF) Website at www.ietf.org.

The statistics (i.e., the total amount of bytes sent in IP packets to particular destination addresses) collected are aggregated into network prefixes carrying a specific amount of bandwidth based on the list of network prefixes retrieved from the central repository 113 per each provider interface 106 separately. Traffic collector 108 calculates the Correction Coefficient for each provider interface 106.

Correction Coefficient is the ratio of (1) provider interface current bandwidth usage rate retrieved by stats collector 110 to (2) the statistics collected by traffic collector 108 (i.e., Correction Coefficient=total bandwidth usage rate for all provider interfaces (in bytes) per X time period/total IP traffic statistics (in bytes) per X time period). Bandwidth data usage averages for a specific period of time for each of the analyzed network prefixes are multiplied by the Correction Coefficient, in order to correct the original data volume potentially distorted by router 104 restrictions or the network monitoring protocol sampling rate. That is, the correction coefficient is required to restore traffic volume information on a per-network prefix basis due to certain router's 104 restrictions or due to the sampling rate (selective traffic information collection in network devices.) The statistics are stored in the central repository 113 every specific period of time.

Traffic collector 108 updates bandwidth data usage averages for a specific period of time for each network prefix, per provider interface, and stores the statistics in the central repository 113 for subsequent use by bandwidth controller 112.

As indicated above, frontend 114 is an interaction interface between operator and network controller 100. Frontend 114 is used for configuration, reporting and management purposes. Frontend 114 includes a GUI (Graphical User Interface), CLI (Command Line Interface), Statistical Reports an API (Application Programming Interface) and/or other interfaces known to those skilled in the art. As indicated above, operator can be human beings, automated systems, monitoring systems or other systems known to those skilled in the art. Operator can manage or configure the network controller 100 using the frontend 114, which enables adding, editing, deleting data (or other actions) used and exchanged between the modules and the configuration parameter values. This resulting configuration information is then stored in the central repository 113 of network controller 100 in accordance with an embodiment of the present disclosure.

A network prefix is a part of the IP (Internet Protocol) address space in accordance with either IP version 4 or IP version 6 as known to those skilled in the art. Specifically, network prefix is a network part of an IP address and network size. Data packets contain a destination addresses. These destination addresses are aggregated (transformed) into network prefixes. Addresses can be aggregated into a fixed size (IPv4 or IPv6). Subnetting is performed against the target IP addresses to compose the network prefix. The corresponding description for subnets and prefixes is defined in V. Fuller, T. Li, "Classless Inter-domain Routing (CIDR)", IETF RFC 4632.

Network controller 100 in accordance with an embodiment of the present disclosure is useful when at least one provider interface 106 exceeds the bandwidth usage rate limits and there exists one or more available alternative provider interfaces 106 selected as Destination provider interface by the network controller 100.

Figure 3:
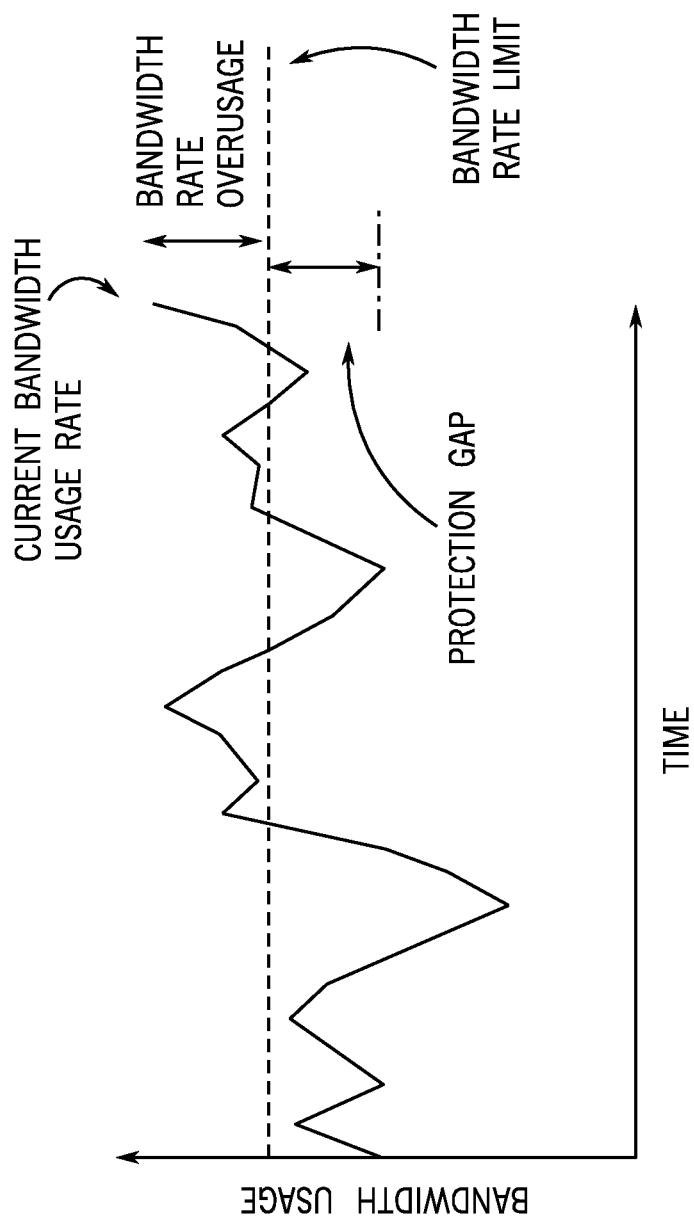
FIG. 3 illustrates an example bandwidth usage rate, current bandwidth usage rate, bandwidth rate limit, bandwidth rate over-usage and a protection gap of a provider interface.

FIG. 3 illustrates a bandwidth usage rate, current bandwidth usage rate, bandwidth rate limit, bandwidth rate over-usage (also referred to as overusage) and a protection gap of a provider interface. The provider interface current bandwidth usage rate and the bandwidth rate limits are set by the operator and stored in the central repository or are automatically evaluated by network controller 100 in accordance with an embodiment of the present disclosure. The exceeding bandwidth rate (traffic) is subject to be rerouted to other provider interfaces. The method (algorithm) of network controller 100 in accordance with an embodiment of this disclosure can reroute more bandwidth rate (traffic) than the exceeded provider interface in order to keep a protection gap as seen in FIG. 3.

The protection gap is an additional bandwidth rate limit that is used to provide a buffer for the bandwidth rate growth up to the bandwidth rate limit without additional intervention by network controller 100, as provider interfaces exceeding bandwidth rate limits tend to further increase their bandwidth usage rate. Typically, the protection gap for provider interface bandwidth rate limits constitutes a subtraction from the provider interface bandwidth rate limits or addition of 5% to the bandwidth limit for a load balanced group of provider interfaces. These limits are configurable by an operator or adjustable protection gaps as known to those skilled in the art. Adjustable protection gaps are discussed below.

The bandwidth rate over-usage is calculated by network controller 100 (bandwidth controller 112) comparing provider interface current bandwidth rate with the limits stored in the central repository 113 or can be automatically calculated by network controller 100 (bandwidth controller 112)

in accordance with an embodiment of the present disclosure, using 95th percentile calculation, algorithms for distributing bandwidth rate limit in a provider interfaces load balanced group or other calculations known to those skilled in the art.

The 95th percentile calculation is done by using well-known algorithms, such as retrieving all bandwidth usage statistics, sorting ascending, ignoring the top 5% of the values. Network controller 100 (modules/algorithms) in accordance with an embodiment of the present disclosure is not limited to a specific amount of percentiles, as other values can be also used.

Figure 4:
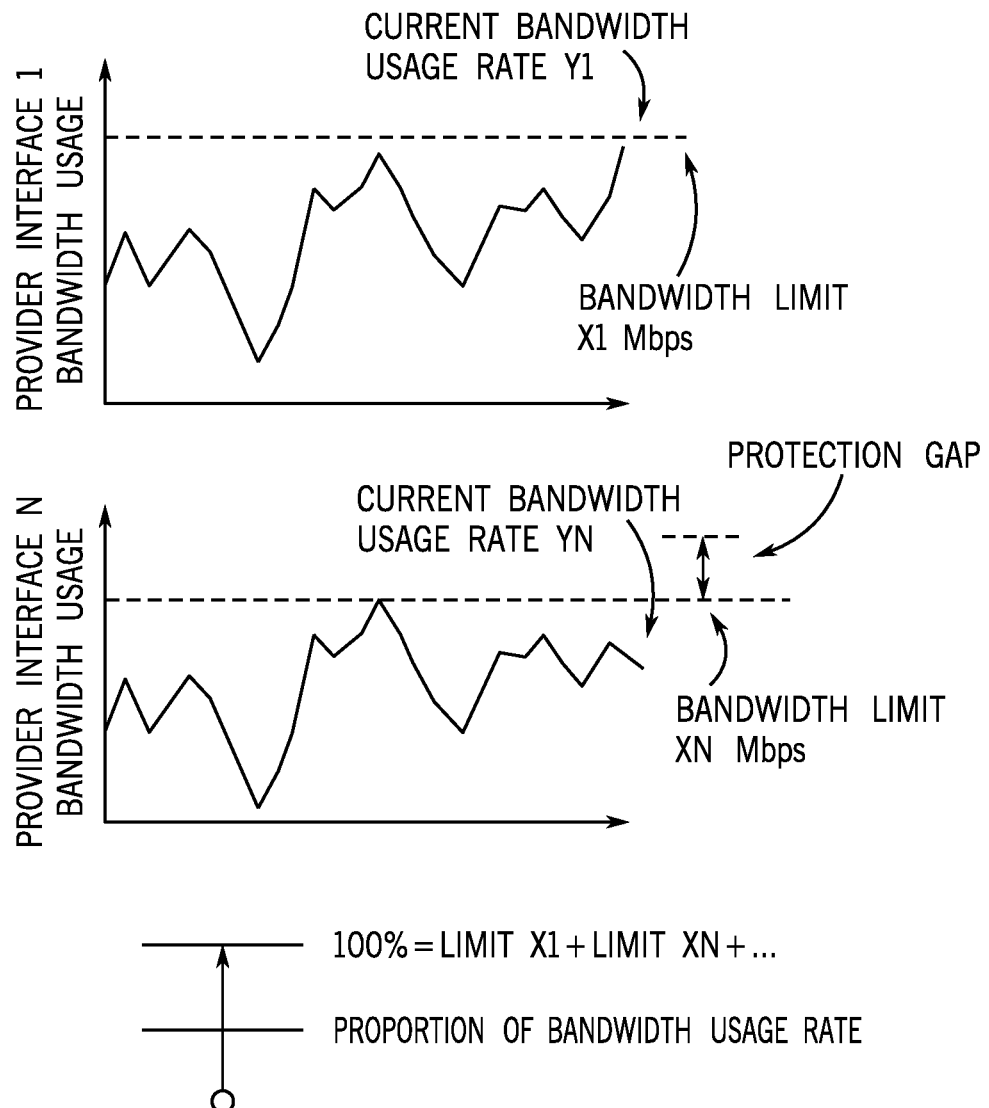
FIG. 4 illustrates two graphs of an example algorithm evaluation of Interface bandwidth usage versus time for exemplary provider interfaces within a provider interfaces group, wherein bandwidth usage rate limits and protection gaps are calculated by the network controller of the system shown in FIG. 1.

FIG. 4 illustrates two graphs of algorithm evaluation (method) of Interface bandwidth usage versus time for exemplary provider interfaces within group of load balanced provider interfaces, wherein bandwidth usage rate limits and protection gaps are calculated by network controller 100 of system shown in FIG. 1. In short, FIG. 4 illustrates the algorithm evaluation (method) of proportional bandwidth rate distribution in a load balanced group of provider interfaces. In order to evaluate the Proportion of bandwidth usage rate for load balanced group of provider interfaces, the algorithm sums the current bandwidth usage rate for each provider interface in the load balanced group of provider interfaces, and divides the result by the sum of each provider interface bandwidth rate limits. In order to evaluate the bandwidth rate limit for a particular provider interface in the load balanced group of provider interfaces, the evaluated Proportion is multiplied by the provider interface bandwidth rate limit.

The formulas in FIG. 4 are used in the following example. Assume provider interfaces current bandwidth rate are obtained and the limits are retrieved from central repository 113 (or calculated as 95th percentile). In this example, two Internet Service Providers (ISP1, ISP2) are part of a load balanced group of provider interfaces. ISP1 has current usage of 250 Mbps and ISP2 has 150 Mbps. ISP1 has a limit of 400 Mbps and ISP has a limit of 600 Mbps. The current bandwidth of ISP1+current bandwidth of ISP2=400 Mbps. The limit of ISP1 and ISP 2 equals 1000 Mbps. 400/1000=0.4 or 40%. So, with the network controller 100 in accordance with an embodiment of the present disclosure, there is 40% of bandwidth usage estimated on each of the provider interfaces within the load balanced group. ISP1 should have 160 Mbps but has 250 Mbps, so 90 Mbps are exceeding the bandwidth rate and are subject to rerouting to any other provider interface. ISP2 can have 240 Mbps but current usage is 150 Mbps. There is thus 90 Mbps of bandwidth rate under-usage. The network controller 100 takes into account bandwidth rate for underused provider interface+volume from the bandwidth correction table in order to estimate bandwidth usage and to prevent possible over-usage on the destination provider interface. This is just one example of the use of the formulas in FIG. 4 and the network controller to manage and control bandwidth usage rates on provider interfaces.

Figure 5A:
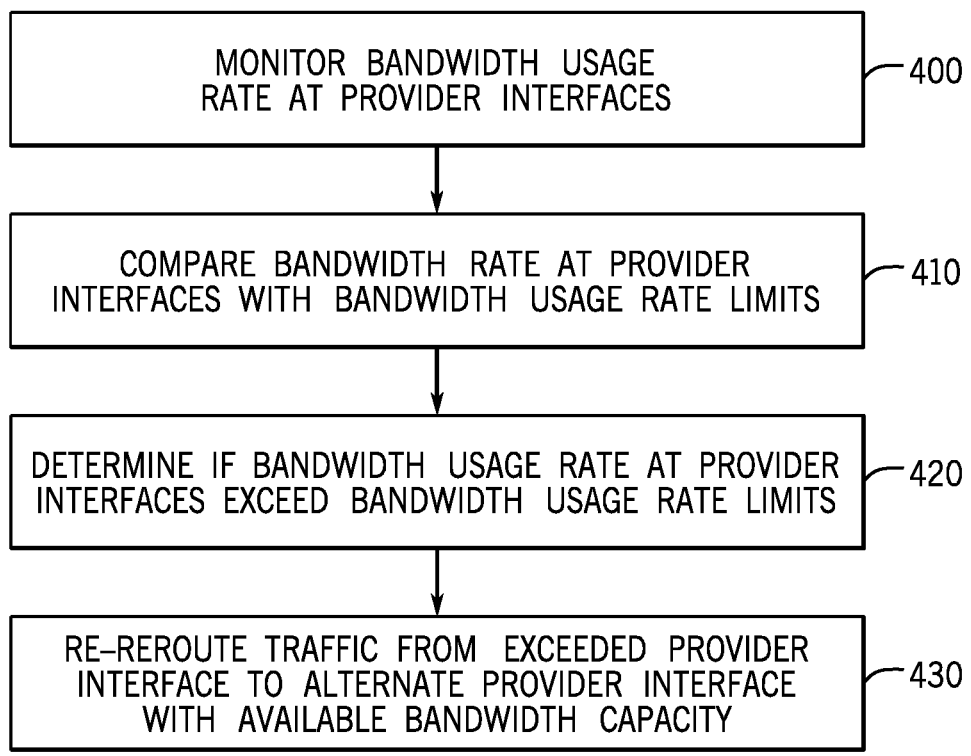
FIG. 5A illustrates a high-level flowchart of example process steps of the bandwidth controller of the system in FIG. 1.

FIG. 5A illustrates a high-level flowchart of an example process steps of the bandwidth controller of the system in FIG. 1. Execution begins with step 400 of the method wherein the bandwidth usage rates at provider interfaces are monitored. At step 410, the bandwidth rates at the provider interfaces are compared with the bandwidth rates limits stored in central repository 113. Bandwidth controller 112 then determines if the bandwidth usage rate at the provider interfaces 106 exceeds the bandwidth usage rate limits at step 420. If so, bandwidth controller 112 then directs rerouting of traffic from the exceeded provider interface 106 to the alternative provider interface with available bandwidth capacity at step 430. Those skilled in the art know that additional steps may be employed or less in accordance with an embodiment of the present disclosure.

Figure 5B:
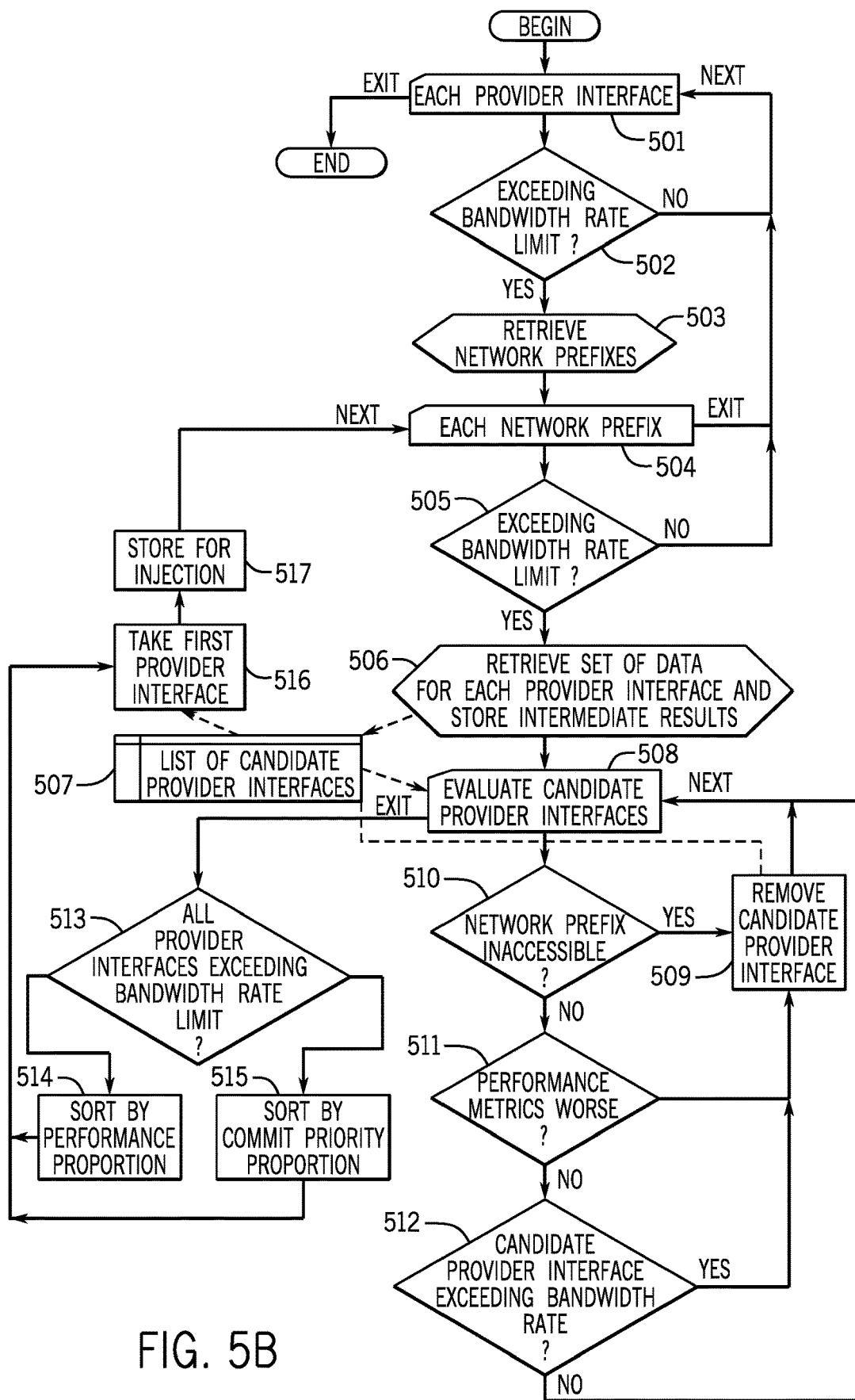
FIG. 5B illustrates a detailed flowchart of example process steps of the bandwidth controller of the system in FIG. 1.

FIG. 5B illustrates a detailed flowchart of an example process steps (algorithm) of the bandwidth controller of the system in FIG. 1. Bandwidth controller 112 retrieves the list of the provider interfaces 106 from central repository 113 at execution step 501. For each provider interface, at decision step 502, the bandwidth controller 112 (algorithm) checks if the current bandwidth rate limit is greater than bandwidth rate limit set by the operator and stored in the central repository 113 or 95th bandwidth rate limit, or greater than bandwidth rate limit inside a provider interface group. Once the bandwidth over-usage is confirmed, the bandwidth controller 112 (algorithm) retrieves from central repository 113 the list of network prefixes carrying a specific amount of bandwidth (traffic) through this particular provider interface at step 503, and data is collected and aggregated by the traffic collector 108. Bandwidth controller 112 (algorithm) processes each retrieved network prefix at step 504.

Execution moves to decision step 505, wherein bandwidth controller 112 (algorithm) stops analyzing the list of network prefixes from the overloaded provider interface until bandwidth usage rate is brought below the protection gap. Step 505 is required to reroute only exceeding bandwidth (instead of all bandwidth).

Execution moves to step 506 wherein bandwidth controller 112 (algorithm) (1) retrieves from the central repository 113 a set of data for each provider interface, comprising, but not limited to, bandwidth statistics for the latest period analyzed by the traffic collector 108, bandwidth data averages for a specific period of time for each of the analyzed network prefixes, the latest performance metrics data for each of the analyzed network prefixes, and (2) designates (stores) commit priorities into a list of candidate provider interfaces at step 507. "Candidate provider interfaces" is a list of possible candidate provider interfaces to which the traffic may potentially be routed. A target provider interface is chosen from this list for rerouting traffic.

Bandwidth controller 112 (algorithm) can use performance metrics such as but not limited to packet loss, latency, jitter of the particular network prefix. In order for bandwidth controller 112 (algorithm) to take performance metrics into the consideration, these metrics have to be collected by a set of methods and algorithms interacting with the network (network explorer 109). Performance metrics can be used to prevent metric deterioration by comparing the metrics for the current route to the metrics for each of other routers in order to block routes with deteriorating (worse) metrics.

Commit priority is a metric set by the operator, stored in the central repository 113 and used in the bandwidth controller 112. In the case where all provider interfaces bandwidth usage rates have exceeded a configured limit, this metric is used to control rerouting so that exceeded bandwidth will be routed to "commit priority" provider interfaces with smaller metric values (up to physical or contractual limits) rather than to those provider interfaces that have exceeded bandwidth and have higher metric values.

Execution moves to step 508, wherein bandwidth controller 112 (algorithm) evaluates the list of candidate provider interfaces. Bandwidth controller 112 will (1) remove the candidate provider interfaces at step 509 if the network prefix is not accessible through the particular candidate provider interfaces at decision step 510, (2) remove the candidate provider interfaces at decision step 509 in case the performance metrics are worse at decision step 511, (3) remove the candidate provider interfaces 509 where current bandwidth usage rate exceeds the bandwidth rate limits at decision step 512. This is done to prevent further over-usage or prevent network performance degradation by the provider interface congestion.

Execution moves to decision step 513 wherein if any of the provider interfaces 513 are not exceeding the bandwidth rate limits, the bandwidth controller 112 (algorithm) sorts the list of the candidate provider interfaces by performance metrics and by the proportion of the current bandwidth usage rate at step 514. However, if all provider interfaces at decision step 513 are exceeding the bandwidth rate limits, the bandwidth controller 112 (algorithm) sorts the list of the candidate provider interfaces by commit priority and by the proportion of the current bandwidth usage rate at step 515.

Execution moves to step 516, wherein bandwidth controller 112 (algorithm) retrieves the first candidate provider interface from the sorted list established in step 507 as a destination provider interface, forming an improvement and stores it in the central repository at step 517 for future injection, i.e., further implementation of the decision. The improvement is a set of data stored in the central repository 113, comprising, without limitation, the network prefix, provider interface exceeding bandwidth rate, destination provider interface, and related performance metrics.

The bandwidth correction table is defined and stored in the central repository 113 to represent bandwidth usage rate changes for provider interfaces based on network prefixes carrying a specific amount of bandwidth, rerouted from the original provider interface 106 to the destination provider interface. The bandwidth correction table stores these results in order to estimate bandwidth usage rate for provider interfaces taking into account all re-reroutes made between bandwidth measurements. An example of this appears at the rear of this application.

Bandwidth controller 112 (algorithm) modifies bandwidth correction table stored in the central repository 113 by subtracting the bandwidth data averages of the analyzed network prefix from the current bandwidth usage rate of provider interfaces 106 exceeding bandwidth rate limits and adding bandwidth data averages for analyzed network prefix to the current bandwidth usage of destination provider interface stats values.

The bandwidth correction table is reset each time the stats collector 110 retrieves provider interfaces 106 bandwidth statistics from the routers 104 and stores them into the central repository 113.

As indicated above, FIG. 5B illustrates the detailed process steps of bandwidth controller 112. Those skilled in the art know that the listed steps may be formulated in different order, additional steps may be included, or one or more steps may be removed to the same desired outcome.

Figure 6:
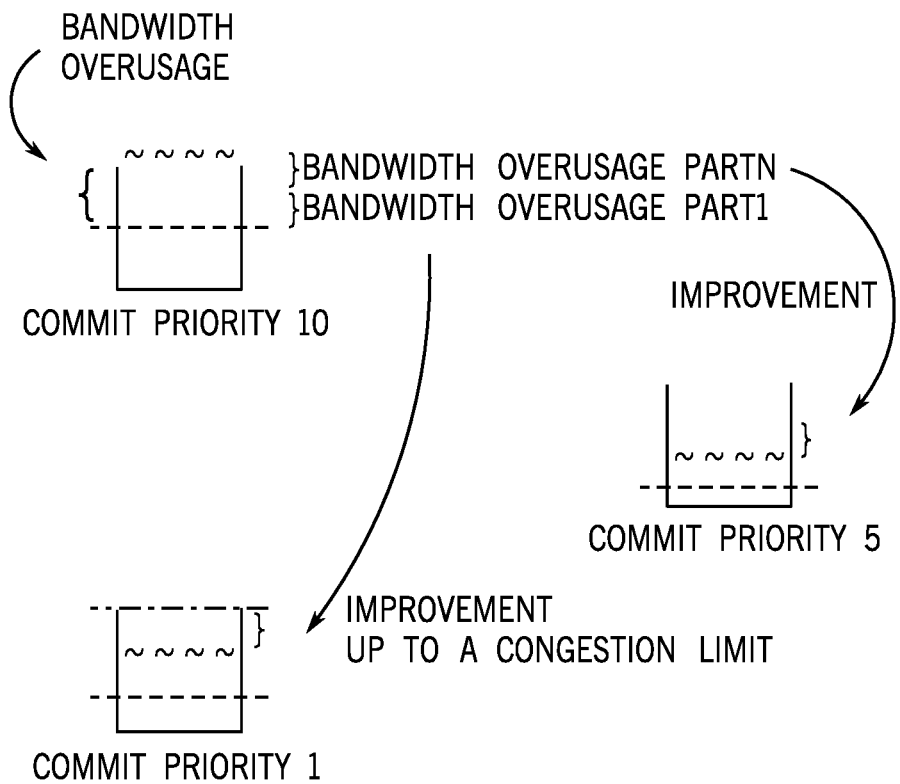
FIG. 6 illustrates an exemplary figures in which Commit Priorities are shown for all provider interfaces that exceed bandwidth rate limits.

FIG. 6 illustrates the Commit Priorities usage to reroute bandwidth over-usage from the provider interface with higher commit priority, to the provider interfaces with lower Commit Priorities, until the provider interface congestion limits are met. As shown, bandwidth overusage part1 filled up provider interface with commit priority 1 up to its congestion limit. Therefore, bandwidth overusage partN has been rerouted to provider interface with commit priority 5.

Figure 7:
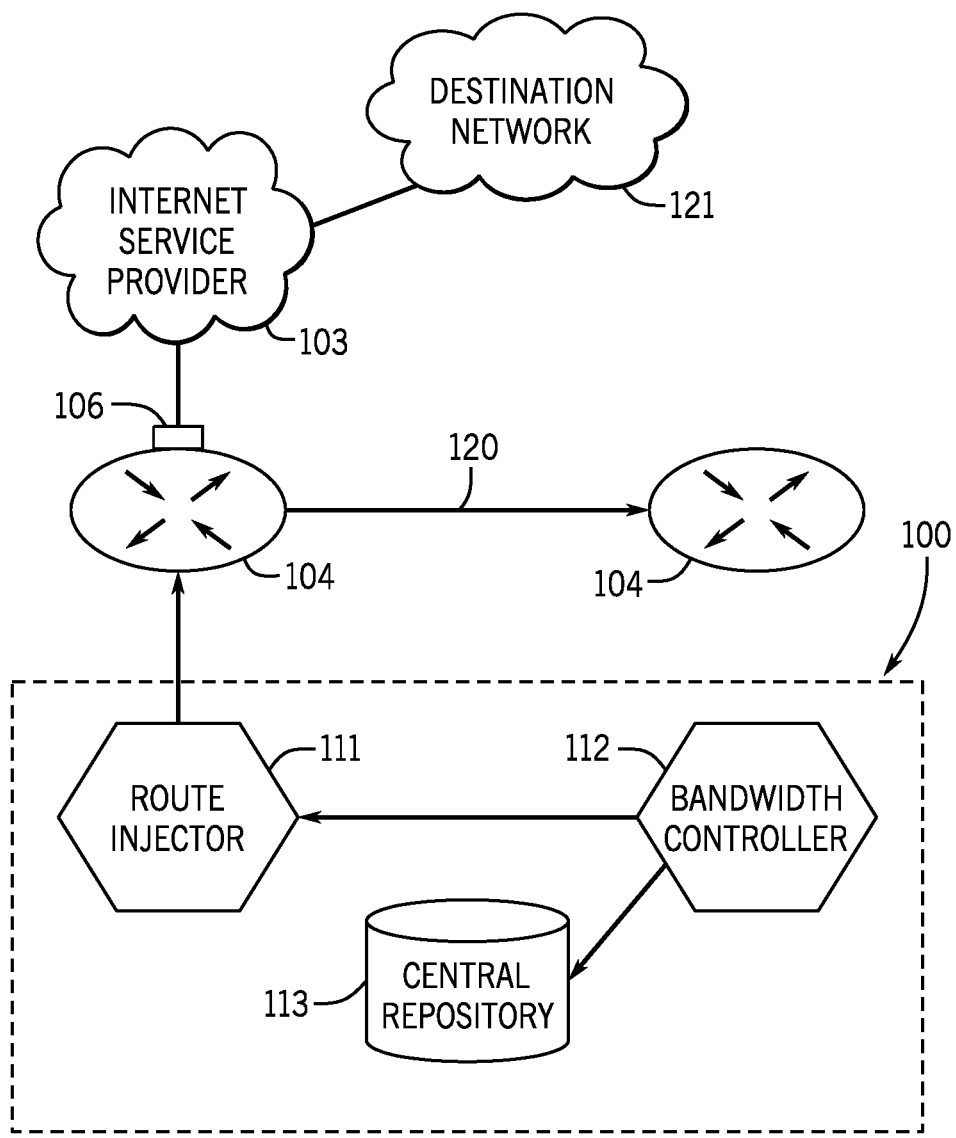
FIG. 7 illustrates an example implementation of the decision made by the present bandwidth controller in FIG. 2 in accordance with an embodiment of the present disclosure.

FIG. 7 illustrates the implementation of the decision made by the present bandwidth controller 112 in FIG. 2 in accordance with an embodiment of the present disclosure. Bandwidth controller 112 stores information in the central repository 113 to be used by frontend 114 and for Improvement injection by the route injector 111 to router 104 by using (but not limited to) Border Gateway Protocol 4 (BGP-4) as defined in the Y. Rekhter, T. Li, S. Hares, "A Border Gateway Protocol 4 (BGP-4)", IETF RFC 4271; Open the Shortest Path First (OSPF) as defined in the J. Moy, "OSPF Version 2"; IETF RFC 2328; D. Savage, D. Slice, J. Ng, S. Moore, R. White, "Enhanced Interior Gateway Routing Protocol", IETF draft-savage-eigrp-00; Command Line interface via secure shell or telnet protocol; or Serial Port or any other protocol, port or method for configuring router 104, by executing router-specific configuration commands. Further, the Improvement is propagated between routers 104 by the dynamic routing protocols 120 (link) established between routers 104 used in order to apply the implementation to the controlled network 105.

The network controller 100 in accordance with an embodiment of the present disclosure executes steps of the methods in which the original network prefix is split in two or more network prefixes, in order to interact with router 104 by the dynamic routing protocol (such as but not limited to the BGP-4, EIGRP, OSPF) and to preserve attributes and metrics for the injected network prefix, from the original network prefix.

Figure 8A:
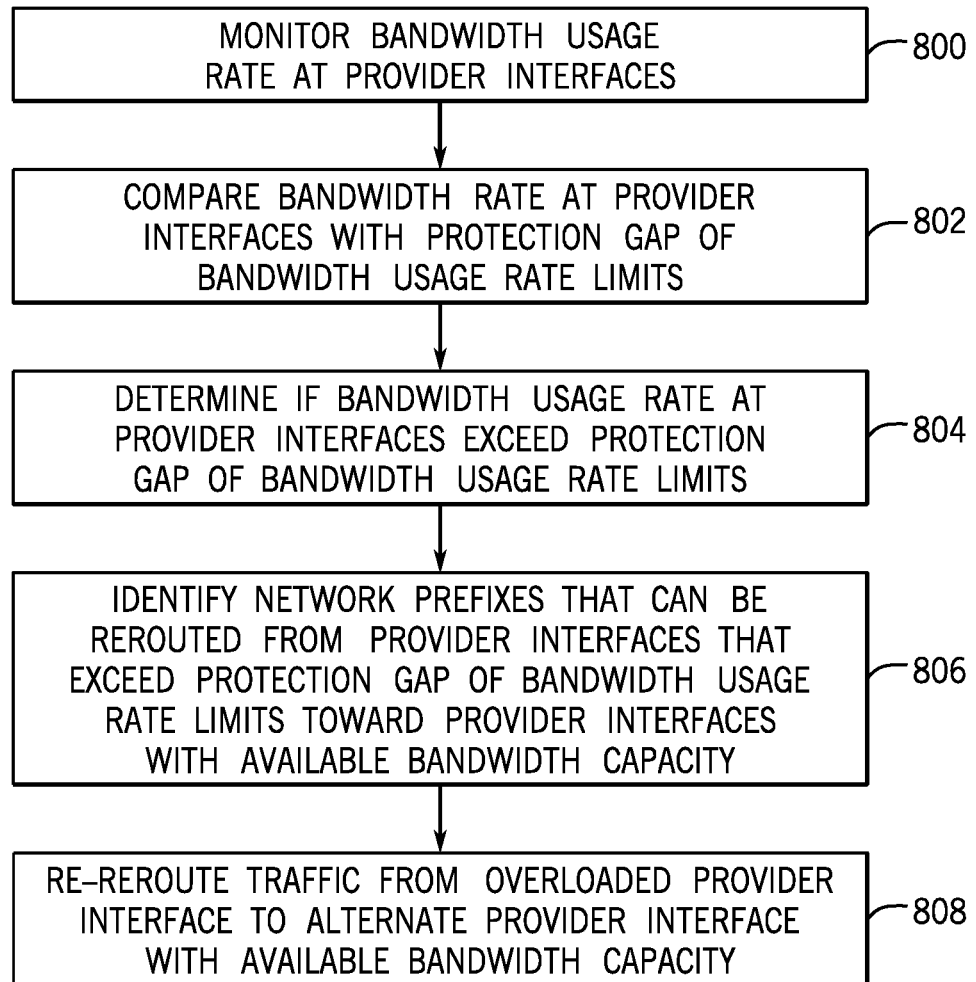
FIG. 8A illustrates a high-level flowchart of another example process steps of the bandwidth controller of the system in FIG. 1.

FIG. 8A illustrates a high-level flowchart of another example of the process steps of bandwidth controller 112 of the system in FIG. 1. Execution begins with step 800 of the method wherein the bandwidth usage rates at provider interfaces are monitored. At step 802, the bandwidth rates at provider interfaces are compared with the protection gap of bandwidth rates limits stored in central repository 113. This protection gap is adjustable. The bandwidth controller 112 uses the adjustable protection gap so that small bandwidth rate usage increases on the provider interfaces do not result in its bandwidth rate limit being exceeded. The bandwidth controller 112 then determines if the bandwidth usage rate at the provider interfaces 106 exceeds the protection gap of bandwidth usage rate limits at step 804. Next at step 806, bandwidth controller 112 identifies network prefixes that can be rerouted from provider interfaces that exceed protection gap of bandwidth usage rate limits to provider interfaces with available bandwidth capacity. Execution then moves to step 808 wherein the Bandwidth controller 112 then directs re-routing of traffic from the exceeded provider interface 106 to the alternative provider interface with available bandwidth capacity. Those skilled in the art know that additional steps may be employed or less in accordance with other embodiments.

Figure 8B:
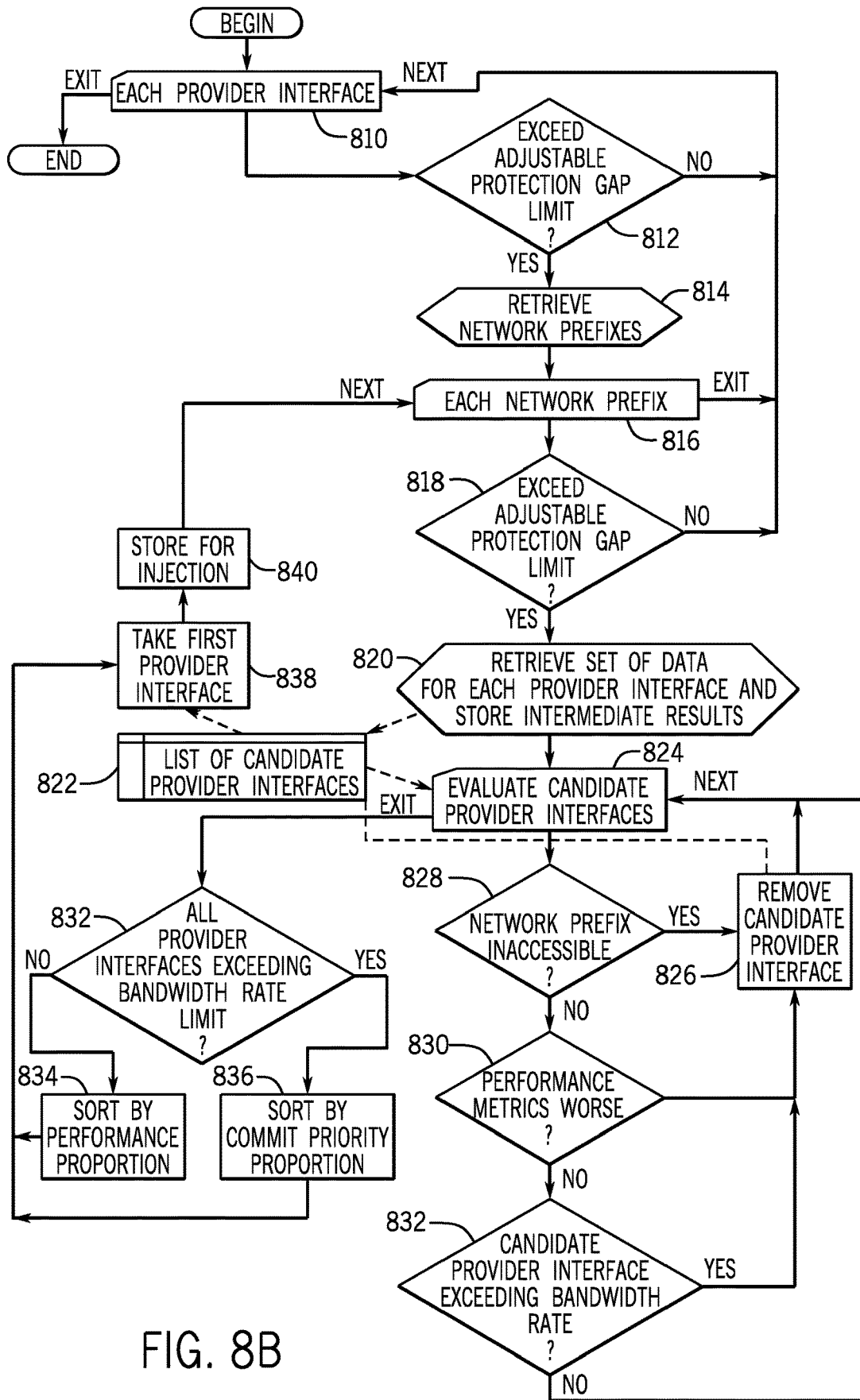
FIG. 8B illustrates a detailed flowchart of another example process steps of the bandwidth controller of the system in FIG. 1.

FIG. 8B illustrates a detailed flowchart of example process steps (algorithm) of the bandwidth controller 112 of the system in FIG. 1. The flowchart in FIG. 8B is similar to the flowchart in FIG. 5B except that the flowchart reflects the incorporation of an adjustable protection gap as described below.

Execution begins at step 810 wherein bandwidth controller 112 retrieves the list of the provider interfaces 106 from central repository 113. For each provider interface, at decision step 812 the bandwidth controller 112 (algorithm) checks if the current bandwidth rate is greater than the adjustable protection gap calculated by bandwidth controller 112 based on configuration parameters set by the operator and stored in the central repository 113. Once the bandwidth over-usage is confirmed, the bandwidth controller 112 (algorithm) retrieves from central repository 113 the list of network prefixes carrying a specific amount of bandwidth through this particular provider interface at step 814. Bandwidth controller 112 evaluates only those network prefixes that have their performance characteristics for all provider interfaces determined in advance by the network explorer 109 and stored in central repository 113. Bandwidth controller 112 (algorithm) processes each retrieved network prefix at step 816.

Execution moves to decision step 818, wherein bandwidth controller 112 (algorithm) stops analyzing the list of network prefixes from the overloaded provider interface until bandwidth usage rate is brought below the protection gap. Step 818 is required to reroute only exceeding bandwidth (instead of all bandwidth).

Execution moves to step 820 wherein bandwidth controller 112 (algorithm) (1) retrieves from the central repository 113 a set of data for each provider interface, comprising, but not limited to, bandwidth statistics for the latest period analyzed by the traffic collector 108, bandwidth data averages for a specific period of time for each of the analyzed network prefixes, the latest performance metrics data for each of the analyzed network prefixes, and (2) designates (stores) Commit Priorities into a list of candidate provider interfaces at step 822. Candidate provider interfaces is a list of possible candidate provider interfaces to which the traffic may potentially be routed. A target Provider is chosen from this list for rerouting traffic.

Bandwidth controller 112 (algorithm) can use performance metrics such as but not limited to packet loss, latency, jitter of the particular network prefix. In order for bandwidth controller 112 (algorithm) to take performance metrics into the consideration, these metrics have to be collected by a set of methods and algorithms interacting with the network (network explorer 109). Performance metrics can be used to prevent metric deterioration by comparing the metrics for the current route to the metrics for each of other routers in order to block routes with deteriorating (worse) metrics.

Commit priority is a metric set by the operator, stored in the central repository 113 and used in the bandwidth controller 112. In the case where all provider interfaces bandwidth usage rates have exceeded a configured limit, this metric is used to control rerouting so that exceeded bandwidth will be routed to "commit priority" provider interfaces with smaller metric values (up to physical or contractual limits) rather than to those provider interfaces that have exceeded bandwidth and have higher metric values.

Execution moves to step 824, wherein bandwidth controller 112 (algorithm) evaluates the list of candidate provider interfaces. bandwidth controller 112 will (1) remove the candidate provider interfaces 106 at step 826 if the network prefix is not accessible through the particular candidate provider interfaces at decision step 828, (2) remove the candidate provider interfaces at decision step 826 in the event the performance metrics are worse than the performance metrics on the overloaded provider interface at decision step 830, (3) remove the candidate provider interfaces 826 where current bandwidth usage rate exceeds the bandwidth rate limits at decision step 832. This is done to prevent further over-usage or prevent network performance degradation by the provider interface congestion.

Execution moves to decision step 832 wherein if any of the provider interfaces are not exceeding the bandwidth rate limits, the bandwidth controller 112 (algorithm) sorts the list of the candidate provider interfaces by performance metrics and by the Proportion of the current bandwidth usage rate at step 834. However, if all provider interfaces at decision step 832 are exceeding the bandwidth rate limits, the bandwidth controller 112 (algorithm) sorts the list of the candidate provider interfaces by commit priority and by the Proportion of the current bandwidth usage rate at step 836.

Execution moves to step 838, wherein bandwidth controller 112 (algorithm) retrieves the first candidate provider interface from the sorted list established in step 822 as a destination provider interface, forming an Improvement and stores it in the central repository at step 840 for future injection, i.e., further implementation of the decision. The Improvement is a set of data stored in the central repository 113, comprising, without limitation, the network prefix, provider interface exceeding bandwidth rate, destination provider interface, related performance metrics.

As stated above with respect to FIG. 5B, the bandwidth correction table is defined and stored in the central repository 113 to represent bandwidth usage rate changes for provider interfaces based on network prefixes carrying a specific amount of bandwidth, rerouted from the original provider interface 106 to the destination provider interface. The bandwidth correction table stores these results in order to estimate bandwidth usage rate for provider interfaces taking into account all re-reroutes made between bandwidth measurements. An example of this appears at the rear of this application. Bandwidth controller 112 (algorithm) modifies bandwidth correction table stored in the central repository 113 by subtracting the bandwidth data averages of the analyzed network prefix from the current bandwidth usage rate of provider interfaces 106 exceeding bandwidth rate limits and adding bandwidth data averages for analyzed network prefix to the current bandwidth usage of Destination provider interface stats values.

The bandwidth correction table is reset each time the stats collector 110 retrieves provider interfaces 106 bandwidth statistics from the routers 104 and stores them into the central repository 113.

As indicated above, FIG. 8B illustrates the detailed process steps of bandwidth controller 112. Those skilled in the art know that the listed steps may be formulated in different order, additional steps may be included, or one or more steps may be removed to the same desired outcome.

The algorithm used to calculate the adjustable protection gap will now be described. As indicated above, bandwidth controller 112 uses a protection gap so that small increases on bandwidth rate usage on a provider interface do not exceed its bandwidth rate limit. The protection gap should be chosen to optimally use the capacity of the provider interface but ensure that the bandwidth usage rate limit violations are kept to a minimum. That is, if the protection gap is too small, small increases in bandwidth rate usage will cause bandwidth rate over-usages. If the protection gap is large then bandwidth rate usage increases will not result in bandwidth rate over-usages. However, a provider interface will not be used to its capacity if a large protection gap is employed.

In accordance with an embodiment of this disclosure, the bandwidth controller 112 automatically adjusts the protection gap based on the number of past or previous bandwidth over-usages (overloads) during a particular billing period. That is, the quantity of previous bandwidth over-usages will dictate whether the protection gap will be increased or decreased in value. Burstable-billing typically, as known to those skilled in the art, specifies how many of the top highest bandwidth rate over-usages will be excused and as such will not incur any penalties. A customer is billed by the bandwidth rate usage at a contracted centile. If this value still exceeds bandwidth rate limit then the customer incurs penalties according to the excess over-usage.

Given the configured start day of a billing period, the sampling interval and the centile that the customer is billed, bandwidth controller 112 calculates and spreads evenly the number of allowed bandwidth rate over-usages for the entire billing period. For a given moment in time, bandwidth controller 112 determines the number of allowed bandwidth rate over-usages and compares it to the number of previously recorded bandwidth rate over-usages. Depending on the comparison, bandwidth controller 112 will increase or decrease the protection gap as described in the example below.

Figure 9:
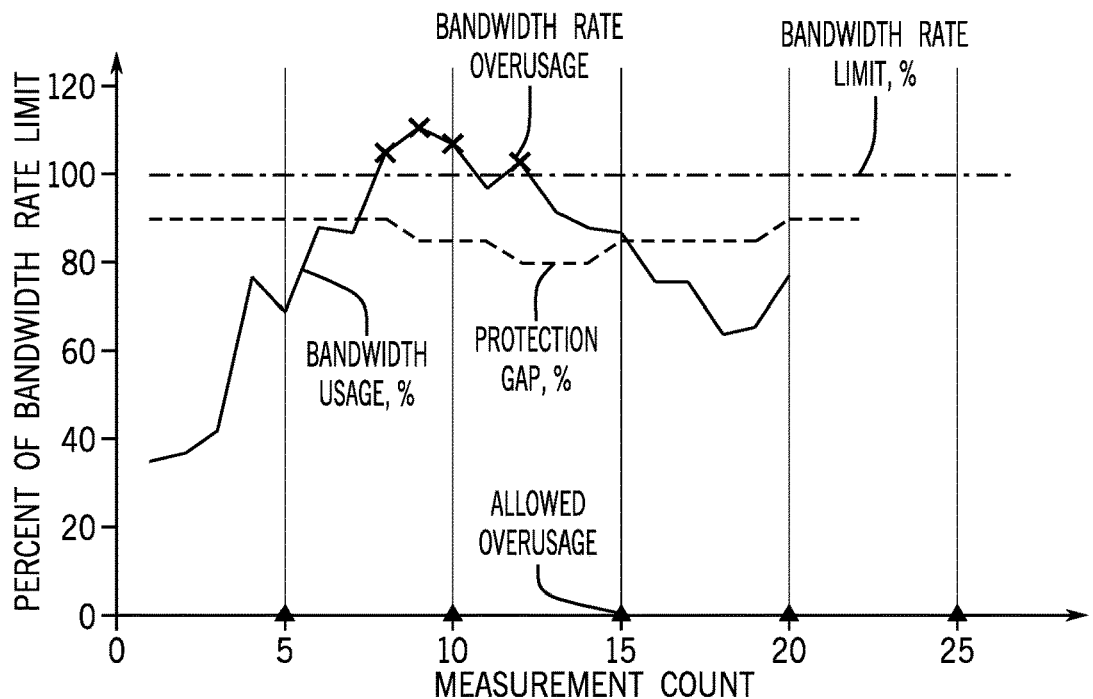
FIG. 9 illustrates a graph of percentage adjusted protection gap of bandwidth usage rate limit per measurement and overusage count.

Typical burstable billing agreements use 95th centile and 5 minute sampling (measuring) intervals. These values also mean that 1 in 20 measurements (or 5 in 100) are allowed to exceed a bandwidth rate limit for a provider interface. In another instance, an 80th centile is used that allows 1 in every 5 measurements to exceed bandwidth rate over-usage (non-penalized). FIG. 9 is a graph that depicts this example. Specifically, FIG. 9 illustrates a graph depicting an example of the percentage of bandwidth usage rate limit versus measurement count. The flow of measurements is shown and individual measurements and (non penalized) allowed overusages.

Figure 10:
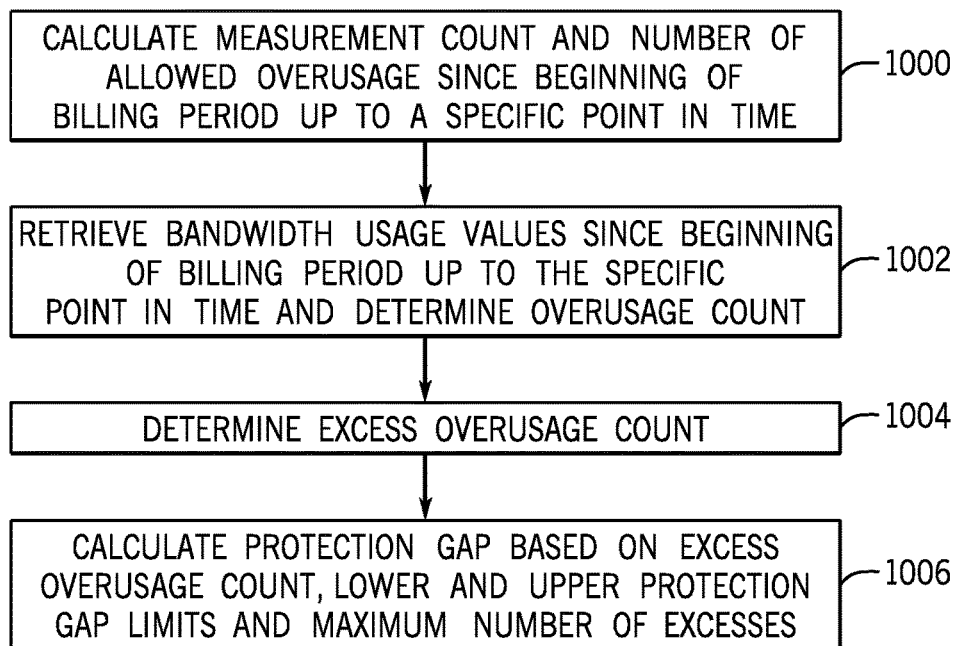
FIG. 10 illustrates a flowchart of example process steps of the calculation of the adjustable protection gap.

FIG. 10 illustrates a flowchart of example process steps of the calculation of the adjustable protection gap. In particular, execution begins with step 1000 wherein bandwidth controller 112 calculates the measurement count and the number of (non-penalized) allowed bandwidth overusages at a specific moment in time using the following formula:

$$\text{Allowed Overusages}=\text{Floor}(\text{Measurement Count}*(100-\text{Centile})/100)$$

whereby the variables are defined as follows:

$$\text{"Measurement Count"}=\text{Floor}(\text{Now}-\text{Start})/\text{Interval}.$$

"Measurement Count" is the number of measurement count during a billing period up to the specific moment in time.

"Centile" is the configure centile value. Typically it is 95%. FIG. 9 employs 80%.

"Floor" is the rounding down function.

"Now" is the specific moment in time in minutes.

"Start" is the time in minutes of the beginning of the billing period.

"Interval" is the length in minutes of the sampling interval (typically 5 minutes.)

FIG. 9 presents the number of measurements on the horizontal axis and highlights allowed over-usages. For example, if for a specific moment in time Measurement Count is 14, then only 2 overusages are permitted as depicted by triangles at measurement 5 and 10 on the horizontal axis.

Now, execution moves to step 1002 wherein bandwidth controller 112 retrieves bandwidth usage values from the central repository 113 at the start and desired end points of a billing period, and then determines (counts) the number of bandwidth rate overusages recorded. The traffic collector 108 and stats (statistics) collector 110 continue to generate and store these bandwidth rate overusage values in the central repository 113. The central repository 113 ensures that all of its recordings are stored during a current billing period.

Bandwidth controller counts the number of bandwidth rate overusage for current billing period as follows:

For each (Measurement between (Start, Now), if (Bandwidth Usage>Bandwidth Rate Limit), then increment Overusage Count; where the following variables are defined:

"Measurement" represents individual records stored in the central repository 113 that include bandwidth rate usage values.

"Start" is the beginning of the billing Interval.

"Now" is the specific moment in time for which bandwidth controller 112 makes the calculation.

"Bandwidth Usage" is the actual bandwidth usage recording when a measurement is taken.

"Bandwidth Rate Limit" is the configured bandwidth rate limit for the specific provider interface.

"Overusage Count" is the number of bandwidth rate over-usage recorded during this billing period.

FIG. 9 also highlights bandwidth rate over-usage measurements with an "x" on the bandwidth rate usage line. For the example, when there have been 14 measurements, then the number of over-usages up to measurement 14 is 4.

Execution then proceeds to step 1004, wherein bandwidth controller 112 determines the number of previous overusages (Overusage Count below) that exceed the number of allowed overusages (Allowed Overusages below). If the number of previous overusages (Overusage Count) is smaller than the allowed overusages (Allowed Overusages), then the protection gap will have the nominal value. The formula below reflects this relationship:

$$\text{Excess Overusage Count}=\max(0, \text{Overusage Count}-\text{Allowed Overusages}) \text{ whereby "max" is a function that returns the maximal value from a given set of values.}$$

For example, FIG. 9 illustrates that the Measurement Count=14 while the Excess Overusage Count=(4−2), i.e., 2.

Execution then proceeds to step 1006, wherein bandwidth controller 112 calculates the protection gap. The protection gap is calculated based on (1) upper and lower protection gap limits and on the number of adjusting steps given by the maximum number of excess overusages that it considers acceptable. These are calculated by the following formula:

$$\text{ProtectionGap}=\text{LIMIT\_UP}-(\text{LIMIT\_UP}-\text{LIMIT\_LOW})*\min(1, \text{Excess Overusage Count}/\text{MAX\_ALLOWED\_EXCESS}).$$

whereby the following variables are defined:

"LIMIT_UP" is the upper level in percentage when bandwidth controller 112 starts rerouting traffic. Typically this value is configured to be 99%. However, a user may select other values for LIMIT_UP as desired.

"LIMIT_LOW" is the lower level in percent when bandwidth controller 112 starts rerouting traffic. This is configurable and will typically be a value around 75-80%. However, those skilled in the art know that other values may be selected for LIMIT_LOW.

"min" is a function that returns the minimal value from a given set.

"Excess Overusage Count" is the value calculated above.

"MAX_ALLOWED_EXCESS" is the adjustable value that helps determine the protection gap. This value enables the excess overusage count to be transformed into percent for the bandwidth limits and protection gap value. If MAX_ALLOWED_EXCESS value is 5, then 5 excessive past overusages will bring the protection gap to its lower limit. If this value is set to 50 then the 5 past overusages mentioned above set the protection gap at only 10 percent of the interval between LIMIT_UP and LIMIT_LOW. The system sets this value at the number of overloads allowed per day but those skilled in the art know that other values can be employed.

For example, FIG. 9 illustrates that the protection gap percentage between measurement 10 and 15 is two steps down from protection gap's upper limit.

Bandwidth controller 112 calculates the protection gap value as percentage of bandwidth rate limit. Subsequently, bandwidth controller 112 uses the value to calculate a value in Mbps using the formula: ProtectionGapMbps=Bandwidth Rate Limit*Protection Gap/100%. Once the protection gap is calculated, bandwidth controller 112 uses this value to determine when it shall start rerouting traffic from a specific provider interface and make the decisions based on the configured bandwidth.

The entire algorithm is made as part of decision diamond 812 in FIG. 8B and the calculated value is reused in subsequent steps of FIG. 8B.

Figure 11:
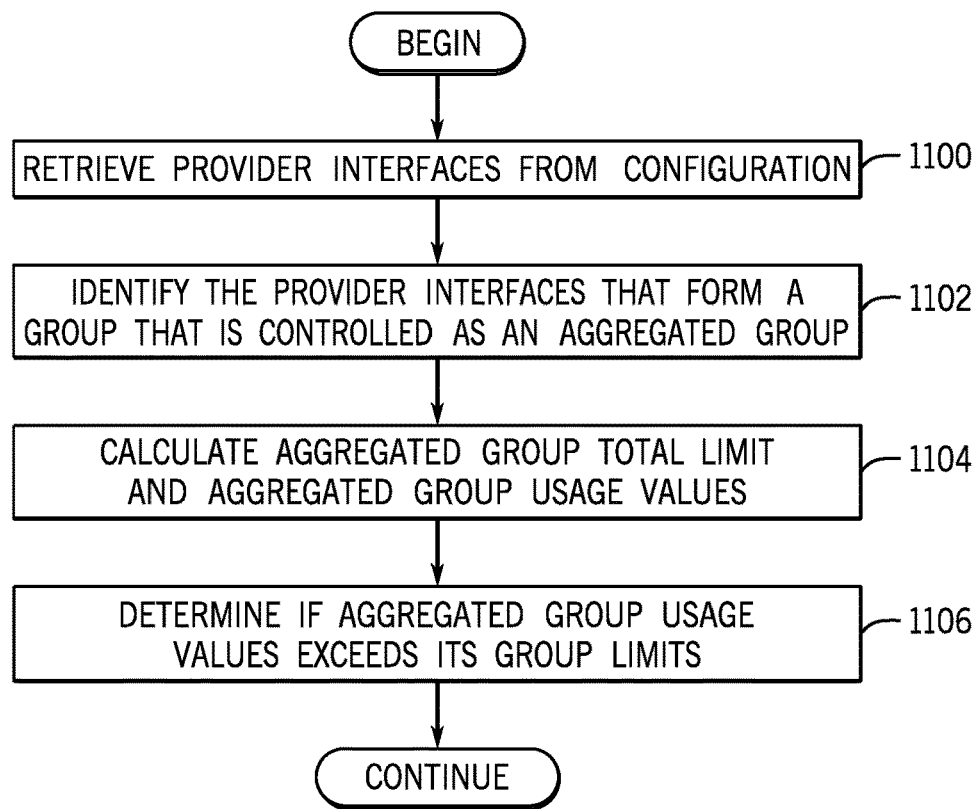
FIG. 11 illustrates a flowchart of example process steps for controlling bandwidth for an aggregated group of provider interfaces.
Figure 12:
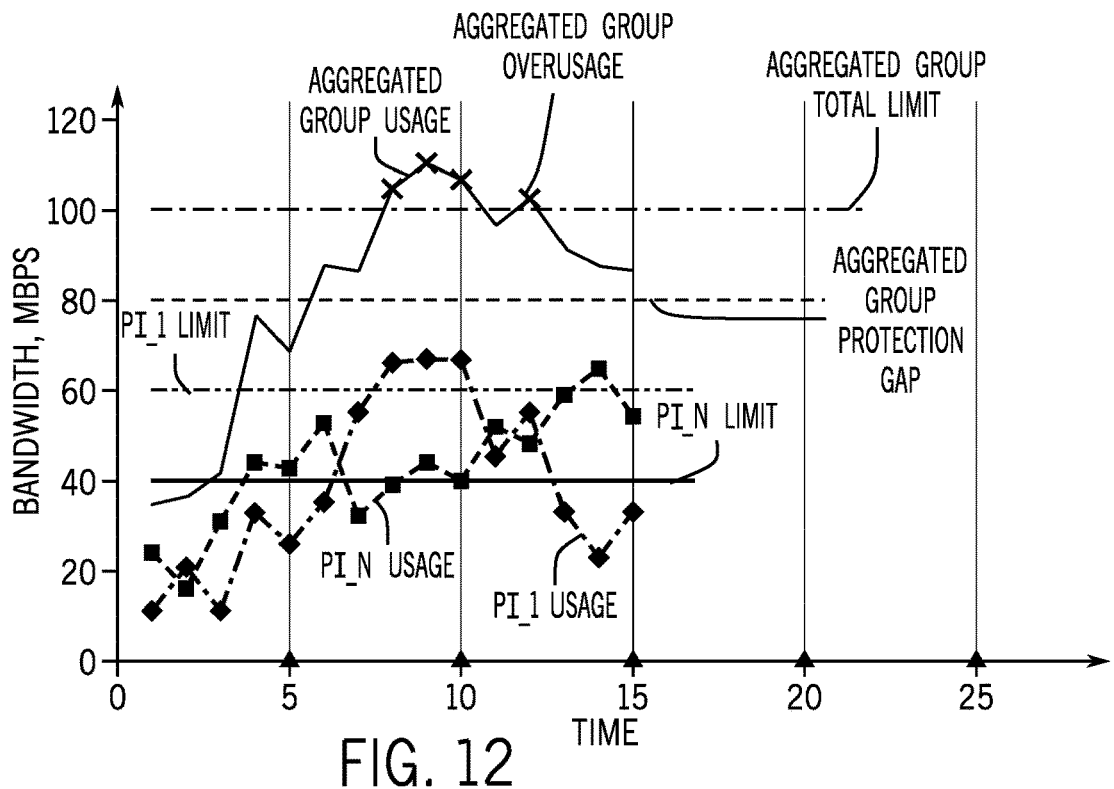
FIG. 12 illustrates a graph depicting an example of (two) provider interface bandwidth rate usage limits and aggregated group limits.

The discussion now relates to controlling bandwidth usage on an aggregated group of provider interfaces and reference is made to FIGS. 11 and 12.

Customers have the option to deploy network configurations with a several provider interfaces that interconnect with a single ISP. Additional provider interfaces can be advantageous in several circumstances. For example, the additional provider interfaces may provide sufficient capacity in the event that a single provider interface cannot fulfill very large capacity requirements or provide redundancy in the event that one provider interface becomes non-operational. In this case, the network can revert to the remaining provider interfaces and continue operating. In accordance with an embodiment of this disclosure, the provider interfaces may be configured to form a group or an aggregated group. The combined behavior of the aggregated group may be controlled (by controlling the characteristics of provider interfaces). Some of these behaviors include load balancing, optimization and bandwidth usage on the aggregated group. Bandwidth usage of the aggregated group is controlled as described below.

Bandwidth controller 112 recognizes the number of provider interfaces that are controlled as an aggregated group. These provider interfaces are configured as a group and their characteristics of the provider interfaces are summed (e.g., provider interface 1, provider interface 2, provider interface N). Two characteristics are used for the aggregated group—bandwidth limit and current bandwidth usage rate. These are calculated as follows:

Aggregated Group Total Limit=Bandwidth Limit PI_1+Bandwidth Limit PI_2 . . . +Bandwidth Limit PI_N. ("PI" is the provider interface).

Aggregated Group Total Usage=Current Bandwidth Usage PI_1+ . . . +Current Bandwidth Usage PI_N.

The aggregated group characteristics are used to control bandwidth usage, for example, to calculate the protection gap or to decide if a bandwidth rate overusage event has occurred. The characteristics of the aggregated group are used to make a decision in diamond 812 in FIG. 8B. The detailed workflow of this operation is depicted in FIG. 11 wherein a flowchart is illustrated of example process steps of controlling bandwidth for aggregated group provider interfaces 106.

In a particular, execution begins at step 1100 wherein provider interfaces are retrieved from configuration established by an operator (user).

Execution proceeds to step 1102 wherein provider interfaces 106 are identified and formed as an aggregated group for subsequent bandwidth control.

Execution then proceeds to step 1104 wherein the aggregated group total bandwidth limit and aggregated usage values are calculated.

Execution then proceeds to step 1106 wherein aggregated group usage values are compared to group limits and it is determined if such values exceed such limits. Execution then ultimately proceeds to step 812 in FIG. 8B. The remaining steps are the same as in FIG. 8B. Therefore, these steps will not be repeated here.

FIG. 12 illustrates a graph depicting an example of characteristics of two provider interfaces whereby (1) provider interface 1 and provider interface N limits that are used to calculate the overall Aggregated Group Total Limit, (2) provider interface 1 and provider interface N bandwidth usage are used to calculate aggregated group total usage, (3) aggregated group total limit and aggregated group total usage are the resulting values of above two operations, (4) aggregated group overusages highlight the events when actual aggregated group total usage exceeded aggregated group total limit and (5) aggregated group protection gap is calculated based on the aggregated group total limit. Aggregated group usage exceeds the aggregated group protection gap and aggregated total limit (100 Mbps) four times (designated by an "x"). FIG. 12 highlights that multiple detected (i.e., registered) overusages on provider interface 1 (starting at measurements 4, 5 etc.) are compensated by underusages on provider interface N. Only when the bandwidth of overusages exceed the bandwidth of underusages bandwidth controller 112 will attempt to re-route some traffic towards provider interfaces that are not part of the group and will consider as overusages measurements that exceeded the aggregated group total limit.

The discussion now turns to an algorithm used to improve system reaction time to prevent bandwidth overusages (fast react algorithm).

As known to those skilled in the art, meters that take bandwidth usage measurements on provider interfaces (in controlled network 105) and an ISP are sampling every 5 minutes. The Multi Router Traffic Grapher (MRTG) is one example of a metering tool (http://oss.oetiker.ch/mrtg/) widely used by those skilled in the art. Bandwidth rate overusages are recorded as an actual overusage when bandwidth usage values measured by the meter exceed configured bandwidth rate limits on a provider interface 106. However, if bandwidth controller 112 is capable of rerouting exceeding traffic with sufficient speed, the bandwidth usage rate measurement will not register a bandwidth rate overusage.

It is assumed that for a previous measurement interval, acceptable bandwidth rate usage values have been observed or in the event that bandwidth rate usage was excessive, then bandwidth controller 112 already took the possible actions in order to reduce it. According to this assumption, it is also assumed that the measurement by a meter is taken at a midway point during a measurement interval (i.e., after approximately 150 seconds). If the measurement by the meter is taken earlier, then the new flows increase less significantly over time. Thus, bandwidth rate usage has a smaller chance to exceed an enforced protection gap. If the measurement by a meter is taken after the midway point in the measurement interval, then bandwidth controller 112 and controlled network 105 have a greater amount of time in which to reroute traffic away from overloaded provider interfaces.

Figure 14:
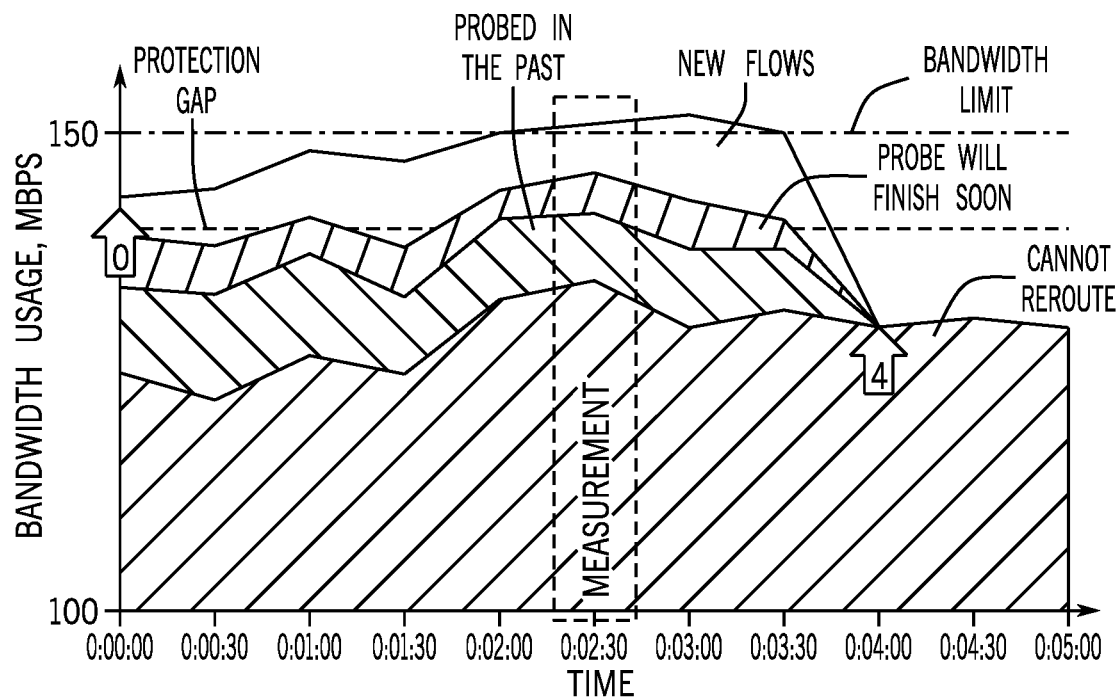
FIG. 14 illustrates a graph depicting categories of traffic distinguished by the bandwidth controller of the system in FIG. 1 over a 5 minute-interval under normal circumstances.
Figure 15:
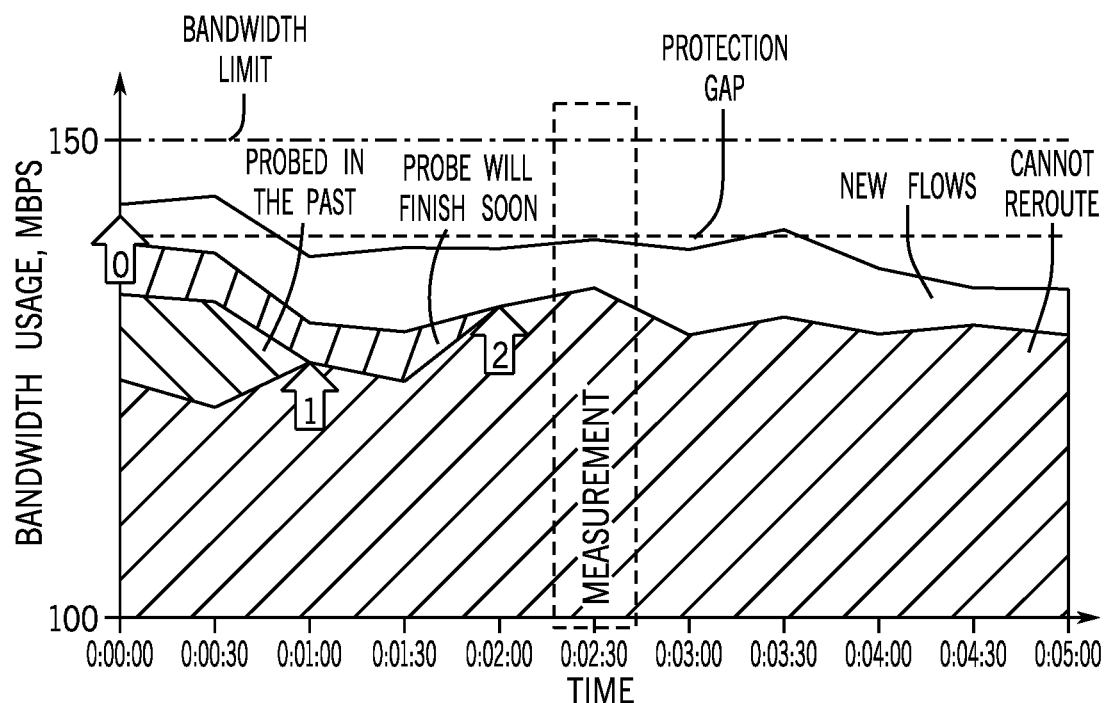
FIG. 15 illustrates a graph depicting categories of traffic distinguished by the bandwidth controller of the system in FIG. 1 over a five-minute interval for the fast react algorithm.

Thus, in accordance with an embodiment of this disclosure, bandwidth controller 112 is configured to recognize that (1) current bandwidth usage is measured by the meter in 5 minute intervals, and the measurement will be taken at a midway point during the interval, (2) there are a number of flows that a) cannot be rerouted due to performance deterioration, b) have been recently rerouted and it is not desirable to repeatedly reroute them since this introduces instability in the routing table, c) are scheduled for probing by network explorer 109 or are being probed but the results are not yet set, d) have been probed by network explorer 109, but the results are not sufficiently timely (outdated) to consider, or e) carry an insignificant and irrelevant bandwidth volume at the specific moment, (3) these flows are represented as a "cannot reroute" category (as seen in FIGS. 14 and 15), (4) network explorer 109 has established network prefix performance characteristics (i.e., probed) many of the active flows on the provider interface. These are depicted by the "probed in the past" category (as seen in FIGS. 14 and 15). These are the first candidate network prefixes that will be considered to be rerouted from the overloaded provider interface to candidate provider interfaces. The risk is that some of the network prefixes have changed their performance characteristics since the probes were made in the recent past, (5) network explorer 109 will finish a few more probes shortly. These flows are grouped under "probe will finish soon" category (as seen in FIGS. 14 and 15), and (6) the new flows, depicted by the white area in FIGS. 14 and 15 have just been scheduled for probing by network explorer 109. Given the lengthy probing interval these flows, while carrying a significant amount of traffic will not be probed in sufficient time to take actions during current measurements cycle. Bandwidth controller 112 can decide to increase their measuring (probing) priority. The results of measuring (probing) will be used in the future as described below.

Figure 13:
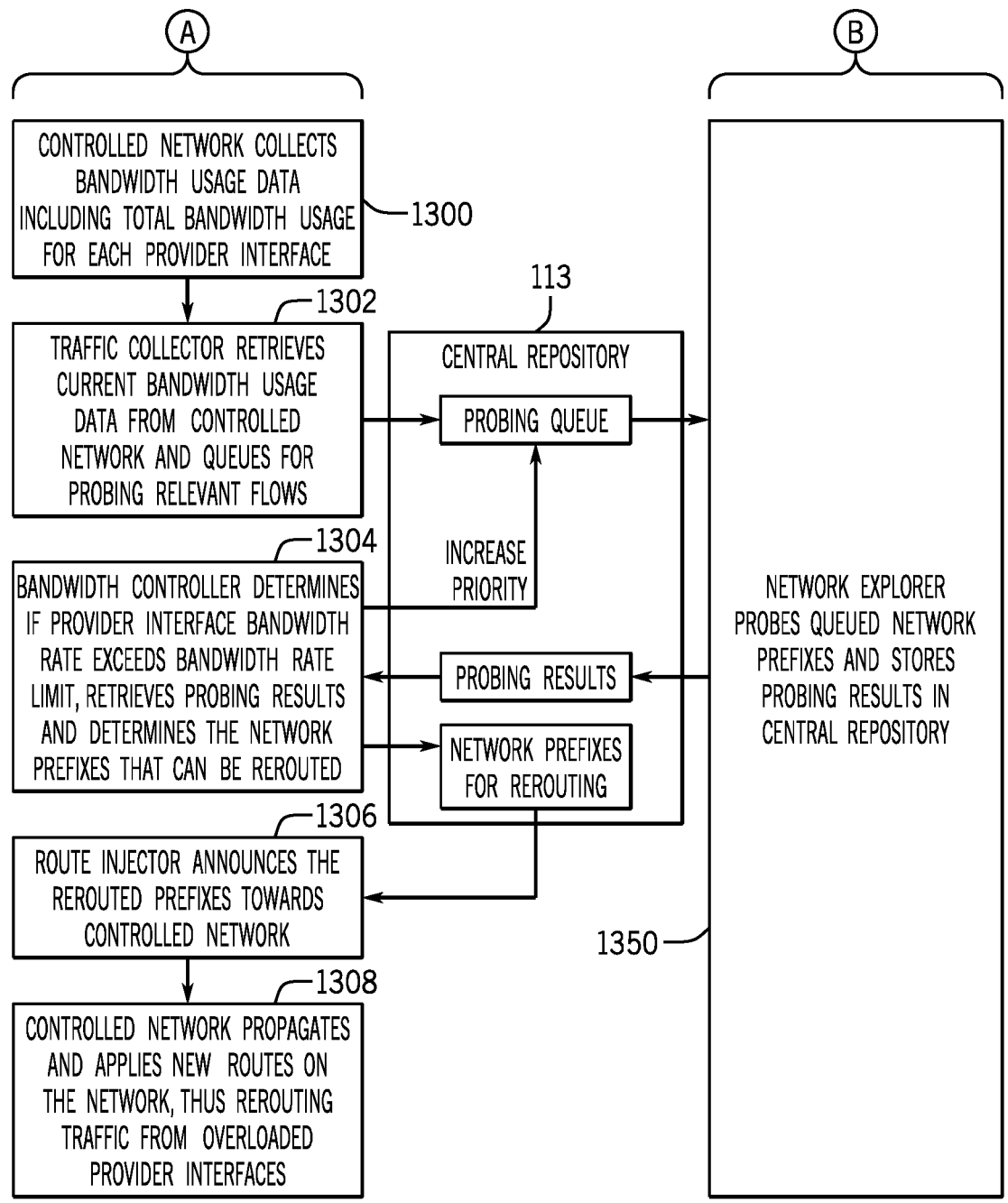
FIG. 13 is a diagram that illustrates example system process steps for controlling bandwidth on controlled network in FIG. 1.

The configuration discussed above is reflected in the flow diagram in FIG. 13 which illustrates example system process steps for controlling bandwidth on controlled network 105. In FIG. 13, the process steps are essentially divided into two sets of steps or system actions ("A" and "B"). The sets work together, but ultimately function independently. The system actions share the operation of central repository 113. In this way, delays in execution of steps from one set of steps will generally not affect the proper execution of the steps of the other set. This is described in more detail below.

Execution begins at step 1300 wherein controlled network 105 collects bandwidth usage data including total bandwidth usage for each provider interface.

Execution then moves to step 1302 wherein traffic collector 108 retrieves bandwidth usage of provider interface 106, passes this data for subsequent analysis including queuing for probing of relevant network prefixes. Only network prefixes that are not already queued are queued for probing. These probing queues are stored in central repository 113. These network prefixes will be evaluated by network explorer 109 in the queued order and the results will become available only in the future and does not influence current cycle reaction times.

As indicated above, set "B" steps are processed simultaneously with the steps under set "A." Specifically, network explorer 109 probes queued network prefixes stored in central repository 113 and stores such probing results in central repository 113. It is important to note that network explorer 109 operates continuously throughout all bandwidth control cycles (wherein a bandwidth control cycle represents the execution steps under set "A" and "B"). That is, network explorer 109 probes queued network prefixes continuously. The results are stored in central repository 113 at step 1310. Because this step is traditionally a time consuming part of the process, the box is enlarged to represent significant time consumption as compared to the other execution step boxes. Traffic collector 108 feeds the probing queue during previous bandwidth control cycles.

Execution proceeds to step 1304 wherein bandwidth controller 112 determines if provider interface 106 exceeds bandwidth rate limit, retrieves probing results (prefixes) from central repository 113 as shown, and determines the network prefixes that can be rerouted. These network prefixes used for rerouting are stored in central repository 113. In other words, bandwidth controller 112 is given an early opportunity to recognize a potential overload. The analysis is done based on existing probe results within central repository 113 without priority scheduling. However, increased probing priorities may be sent for storage in central repository 113 as shown in FIG. 13. (As indicated above, network explorer 109 continuously probes queued network prefixes and stores such probing results in central repository 113.) At this stage, bandwidth controller 112 may not possess complete data about all relevant active flow performance characteristics, and some probe results may be outdated. However, a transitory analysis cycle may retrieve additional probe results during subsequent cycles.

Execution then proceeds to steps 1306 and 1308 wherein the route injector 111 announces rerouted network prefixes to controlled network 105 and controlled network 105 propagates and applies new routes on its network (e.g., routers, switches and other devices that form controlled network 105), thus rerouting traffic from overloaded provider interfaces 104 to provider interfaces 104 that have available bandwidth capacity. In short, controlled network 105 has the opportunity to enforce the rerouting decisions it received from route injector 111.

In this embodiment of the disclosure, network controller 100 will react with greater speed to potential overloads. Execution of the steps in set "A" (bandwidth control cycle) are not affected by delays in execution of the steps in set "B" (probing queued network prefixes). Therefore, execution bandwidth control cycle times are reduced, thereby significantly increasing the chance that a bandwidth overusage event has been addressed when a measurement by a meter is taken.

The bandwidth usage cycles repeat continuously. New probing results become available. In the event that traffic overload conditions re-appear, action will be taken again. By reacting more rapidly, the system is able to adjust to fluctuating conditions and thus bring the network towards desired state in smaller and more frequent steps.

FIG. 14 illustrates a graph depicting categories of traffic distinguished by bandwidth controller (fast react algorithm) over a 5 minute-interval under normal circumstances. FIG. 15 illustrates a graph depicting the same categories of traffic over the five-minute interval for the fast react algorithm. When bandwidth usage for a Provider interface 106 exceeds the protection gap value, bandwidth controller 112 takes action by rerouting network prefixes. Such an event is depicted as moment 0 (zero) in time in FIGS. 14 and 15. The dotted rectangle depicts the time in which a traffic measurement is taken by a metering tool.

As shown in FIG. 14, the use of a cycle without fast react was able to react by minute 4 and the meter measurement registers a bandwidth rate overusage. However, as seen in FIG. 15, the fast react bandwidth usage cycle was carried out two rounds of rerouting actions, thus bringing the bandwidth rate usage values down by the time the meter measurement is taken.

FIG. 16 illustrates a block diagram of a general purpose computer 1600 to support the embodiments of the systems and methods disclosed in this application. In a particular configuration, computer 1600 may be a computer server as described above that is configured to enable part or all of the execution of the computer program modules (software) or application steps in the embodiments disclosed above. The computer 1600 typically includes at least one processor 1602 and system memory 1604 (volatile RAM or non-volatile ROM). The system memory 1604 may include computer readable media that is accessible to the processor 1602 and may include instructions for execution by processor 1602, an operating system 1606 and one or more application platforms 1608, such as Java and one or more modules/software components/applications 1610 or parts thereof. The computer will include one or more communication connections such as network interfaces 1612 to enable the computer to communication with other computers over a network, storage 1616 such as a hard drives, video cards 1614 and other conventional components known to those skilled in the art. This computer 1600 typically runs Unix or Microsoft as the operating system and include TCP/IP protocol stack (to communicate) for communication over the Internet as known to those skilled in the art. A display 1620 is optionally used.

Examples Disclosed Above.
IP Traffic Statistics—Example 1
Sample of "Duplicated Data" and for sFlow sampled data:
Decoding IP packet header:
Source IP address: 10.0.0.1
Destination IP address: 192.168.0.1
Protocol: TCP
Source port: 1024
Destination port: 80
packet size: 1500
IP Traffic Statistic—Example 2
Sample of NetFlow data:
Source IP address: 10.0.0.1
Destination IP address: 192.168.0.1
Protocol: TCP
Source port: 1024
Destination port: 80
packets: 1000
octets: 879000

Octets are measured in bytes and the same as the packet size from the first example. Source and destination IP addresses are extracted in order to determine if this data should be analyzed, network prefix are computed from Destination IP address and packet sizes are summed in order to collect bandwidth statistics.

Bandwidth Statistics—Examples
Measurement time: 11:00:00
Bytes: 1000000100000
Next measurement:
Measurement time: 11:01:00
Bytes: 1000050100000
(Last-Previous)*8/60=bits per second—or Bandwidth statistics.
Where 8 is 8 bits=1 byte
60=seconds between measurements.

Bandwidth statistics represented by the constantly increasing values retrieved by the stats collector 110 from the routers 104 by using Simple Network Management Protocol (SNMP).

Bandwidth Correction Table—Example
The Interface 1 bandwidth usage limit is 101 Mbps.
At 11:00 the Interface 1 bandwidth usage rate measured to 100 Mbps.
At 11:01 the network controller 100 reroutes 5 Mbps from interface 1 to any other interface.
The bandwidth correction table now contains −5 for Int. 1 and +5 for other interface.
Next—desire to reroute 5.5 Mbps TO the Interface 1:
Last measurement—100 Mbps+correction (−5 Mbps)=95 Mbps.+5.5 Mbps which it is desired to reroute to the Interface 1=100.5 Mbps. Is 100.5 Mbps a greater than usage limit (101 Mbps)? Now, traffic can be re-routed and Bandwidth Correction Table now contain −5+5.5=+0.5 Mbps for the Interface 1.

It is to be understood that the disclosure teaches examples of the illustrative embodiments and that many variations of the invention can easily be devised by those skilled in the art after reading this disclosure and that the scope of the present invention is to be determined by the claims below.

We claim:

1. A computer-implemented system for managing bandwidth usage rates in a network, the system including one or more servers configured to execute computer program steps, the computer program steps comprising:
monitoring bandwidth usage rate at a provider interface;
determining bandwidth overusages on the provider interface, whereby bandwidth overusage is determined when a bandwidth rate on the provider interface exceeds a protection gap of a bandwidth rate limit;
determining a number of bandwidth overusages that exceed a number of allowable bandwidth overusages at the provider interface during an interval of time;
adjusting a protection gap for the provider interface based on the number of exceeding overusages to reduce the number of bandwidth overusages to a value less than the number of allowable bandwidth overusages.

2. The computer-implemented system of claim 1 wherein the computer program steps further comprise rerouting Internet traffic from the provider interface based on the protection gap to a second provider interface having available bandwidth capacity.

3. The computer-implemented system of claim 1 wherein the adjusting the protection gap comprises calculating the protecting gap based on a number of excess bandwidth overusages, lower and upper protection gap limits and a maximum number of bandwidth overusages that exceed a predefined number of allowable overusages.

* * * * *